US012787025B2

(12) United States Patent
Chatterjee et al.

(10) Patent No.: US 12,787,025 B2
(45) Date of Patent: Nov. 3, 2026

(54) BWP-BASED OPERATIONS FOR REDCAP USER EQUIPMENT

(71) Applicant: Intel Products IP LLC, Santa Clara, CA (US)

(72) Inventors: Debdeep Chatterjee, San Jose, CA (US); Gang Xiong, Beaverton, OR (US); Toufiqul Islam, Santa Clara, CA (US); Yingyang Li, Beijing (CN)

(73) Assignee: Intel Products IP LLC, Santa Clara, CA (US)

( * ) Notice: Subject to any disclaimer, the term of this patent is extended or adjusted under 35 U.S.C. 154(b) by 177 days.

(21) Appl. No.: 18/279,382

(22) PCT Filed: Mar. 22, 2022

(86) PCT No.: PCT/US2022/021305
§ 371 (c)(1),
(2) Date: Aug. 29, 2023

(87) PCT Pub. No.: WO2022/212122
PCT Pub. Date: Oct. 6, 2022

(65) Prior Publication Data
US 2024/0196413 A1 Jun. 13, 2024

Related U.S. Application Data

(60) Provisional application No. 63/254,847, filed on Oct. 12, 2021, provisional application No. 63/251,298,
(Continued)

(51) Int. Cl.
*H04W 72/232* (2023.01)
*H04L 5/00* (2006.01)
(Continued)

(52) U.S. Cl.
CPC ......... *H04W 72/232* (2023.01); *H04L 5/0053* (2013.01); *H04W 74/0833* (2013.01); *H04W 74/0836* (2024.01)

(58) Field of Classification Search
CPC ........... H04W 72/232; H04W 74/0833; H04W 74/0836; H04W 72/23; H04L 5/0053; H04L 5/0078
See application file for complete search history.

(56) References Cited

U.S. PATENT DOCUMENTS

2018/0183551 A1* 6/2018 Chou ...................... H04L 5/001
2020/0154446 A1* 5/2020 Yerramalli ............ H04W 72/23
(Continued)

FOREIGN PATENT DOCUMENTS

WO WO-2022212122 A1 10/2022

OTHER PUBLICATIONS

"Japanese Application Serial No. 2023-560664, Response filed Feb. 18, 2025 to Notification of Reasons for Refusal mailed Nov. 19, 2024", W English Claims, 18 pgs.
(Continued)

*Primary Examiner* — Christine Ng
(74) *Attorney, Agent, or Firm* — Schwegman Lundberg & Woessner, P.A.

(57) ABSTRACT

A computer-readable storage medium stores instructions to configure a UE for Reduced Capability (RedCap) operation in a 5G NR network, and to cause the UE to perform operations. The operations include decoding a master information block (MIB) to determine a control resource set (CORESET) and a common search space (CSS): decoding a system information block (SIB) in a physical downlink shared channel (PDSCH) scheduled by a downlink control information (DCI) format, the DCI format received based on the CORESET and the CSS: determining an additional
(Continued)

600

CORESET within a separate initial DE BWP using the SIB: and performing reception of a physical downlink control channel (PDCCH) in a PDCCH Type1 Common Search Space (CSS) set or a PDSCH associated with Random Access (RA) procedure in the separate initial DE BWP.

20 Claims, 9 Drawing Sheets

Related U.S. Application Data filed on Oct. 1, 2021, provisional application No. 63/186,736, filed on May 10, 2021, provisional application No. 63/171,982, filed on Apr. 7, 2021, provisional application No. 63/167,580, filed on Mar. 29, 2021.

(51) Int. Cl.
*H04W 74/0833* (2024.01)
*H04W 74/0836* (2024.01)

(56) References Cited

U.S. PATENT DOCUMENTS

| | | | | |
|---|---|---|---|---|
| 2020/0313813 | A1* | 10/2020 | Shi | H04L 5/0042 |
| 2020/0313832 | A1 | 10/2020 | Kim et al. | |
| 2020/0344616 | A1 | 10/2020 | Hwang et al. | |
| 2020/0351951 | A1* | 11/2020 | Shi | H04W 72/0453 |
| 2021/0045100 | A1* | 2/2021 | Park | H04L 1/1854 |
| 2021/0050953 | A1 | 2/2021 | Park | |
| 2022/0038240 | A1* | 2/2022 | Ma | H04L 5/0053 |
| 2022/0150036 | A1* | 5/2022 | Ye | H04L 5/0098 |
| 2023/0072513 | A1* | 3/2023 | Fang | H04W 72/0446 |
| 2023/0179374 | A1* | 6/2023 | Xu | H04L 5/0053 370/329 |
| 2023/0422296 | A1* | 12/2023 | Feng | H04W 74/02 |
| 2024/0031056 | A1* | 1/2024 | Rastegardoost | H04W 74/0833 |

OTHER PUBLICATIONS

"Japanese Application Serial No. 2023-560664, Notification of Reasons for Refusal mailed May 7, 2025", W English Translation, 8 pgs.
"FL summary #4 for UE complexity reduction for RedCap", Moderator (Ericsson), 3GPP TSG RAN WG1 #104-e RI-2101852, Internet, Online]. Retrieved from the Internet: URL: https: www. 3gpp.org ftp tsgranAV G1 _Rl 1 TSGR1104-e Docs R1-2101852. zip, (Feb. 5, 2021), 39 pgs.
"International Application Serial No. PCT US2022 021305, International Preliminary Report on Patentability mailed Oct. 12, 2023", 7 pgs.
"Japanese Application Serial No. 2023-560664, Notification of Reasons for Refusal mailed Nov. 19, 2024", w English translation, 9 pgs.
"3rd Generation Partnership Project; Technical Specification Group Radio Access Network, NR; Physical layer procedures for control (Release 16)", 3GPP TS38.213 V16.4.0, (Dec. 12, 2020), 20 pages.
Moderator, "FL summary #4 for UE complexity reduction for RedCap", 3GPP TSG RAN WG1 #104-e R1-2101852, [Online]. Retrieved from the Internet: URL: https: www.,3gpp.org ftp tsg_ran WG1_RL1 TSGRI_104-e Docs R1-2101852zip, (Feb. 5, 2021), 40 pgs.
"3GPP; TSG RAN; NR; Physical layer procedures for control (Release 16)", 3GPP TS 38.213 V16.4.0, (Jan. 8, 2021).
"International Application Serial No. PCT/US2022/021305, International Search Report mailed Jun. 24, 2022", 4 pgs
"International Application Serial No. PCT/US2022/021305, Written Opinion mailed Jun. 24, 2022", 5 pgs.
Intel Corporation, "On UE complexity reduction for RedCap devices", R1-2100660, 3GPP TSG RAN WG1 Meeting #104-E, (Jan. 19, 2021), 8 pgs.
Moderator (Intel Corporation),, "Moderator summary #3 on RedCap—Others", R1-2009608, 3GPP TSG RAN WG1 MEeting #103-E, (Nov. 6, 2020), 46 pgs.
VIVO, et al., "Discussion on UE Complexity reduction", R1-2100449, 3GPP TSG RAN WG1 #104-e, (Jan. 18, 2021), 6 pgs.
"Japanese Application Serial No. 2023-560664, Decision of Rejection mailed Sep. 24, 2025", w English Translation, 8 pgs.
"Korean Application Serial No. 10-2023-7032863, Notice of Preliminary Rejection mailed Jan. 23, 2026", W English Translation, 13 pgs.
Interdigital, Inc, "Discussion on UE complexity reduction features", R1-2101507, 3GPP TSG RAN WG1 #104-E, 3GPP, Jan. 19, 2021, 5 pgs.

* cited by examiner

BWP-BASED OPERATIONS FOR REDCAP USER EQUIPMENT

PRIORITY CLAIM

This application is a U.S. National Stage Filing under 35 U.S.C. 371 from International Application No. PCT/US2022/021305, filed Mar. 22, 2022 and published in English as WO 2022/212122 on Oct. 6, 2022, which claims the benefit of priority to the following United States Provisional Patent Applications:

U.S. Provisional Patent Application No. 63/167,580, filed Mar. 29, 2021, and entitled "BANDWIDTH PART (BWP)-BASED OPERATIONS FOR REDCAP USER EQUIPMENTS IN RADIO RESOURCE CONTROL (RRC) IDLE OR RRC INACTIVE MODES;"

U.S. Provisional Patent Application No. 63/171,982, filed Apr. 7, 2021, and entitled "BANDWIDTH PART (BWP)-BASED OPERATIONS FOR REDCAP USER EQUIPMENTS IN RADIO RESOURCE CONTROL (RRC) IDLE OR RRC INACTIVE MODES;"

U.S. Provisional Patent Application No. 63/186,736, filed May 10, 2021, and entitled "BANDWIDTH PART (BWP)-BASED OPERATIONS FOR REDCAP USER EQUIPMENTS IN RADIO RESOURCE CONTROL (RRC) IDLE OR RRC INACTIVE MODES;"

U.S. Provisional Patent Application No. 63/251,298, filed Oct. 1, 2021, and entitled "BANDWIDTH PART (BWP)-BASED OPERATIONS FOR REDCAP USER EQUIPMENTS IN RADIO RESOURCE CONTROL (RRC) IDLE OR RRC INACTIVE MODES;" and U.S. Provisional Patent Application No. 63/254,847, filed Oct. 12, 2021, and entitled "BANDWIDTH PART (BWP)-BASED OPERATIONS FOR REDCAP USER EQUIPMENTS IN RADIO RESOURCE CONTROL (RRC) IDLE OR RRC INACTIVE MODES."

Each of the patent applications listed above is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, (MulteFire, LTE-U), and fifth-generation (5G) networks and beyond including 5G new radio (NR) (or 5G-NR) networks, 5G-LTE networks such as 5G NR unlicensed spectrum (NR-U) networks and other unlicensed networks including Wi-Fi, CBRS (OnGo), etc. Other aspects are directed to techniques to configure bandwidth part (BWP)-based operations for Reduced Capacity (RedCap) user equipments (UEs) (e.g., UEs in RRC Idle and RRC Inactive modes) in 5G-NR (and beyond) networks.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in many disparate environments. Fifth-generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in the unlicensed spectrum without requiring an "anchor" in the licensed spectrum, called MulteFire. Further enhanced operation of LTE and NR systems in the licensed, as well as unlicensed spectrum, is expected in future releases and 5G (and beyond) systems. Such enhanced operations can include techniques to configure BWP-based operations for RedCap UEs (e.g., UEs in RRC Idle and RRC Inactive modes) in 5G-NR (and beyond) networks.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects outlined in the claims encompass all available equivalents of those claims.

Figure 1A:
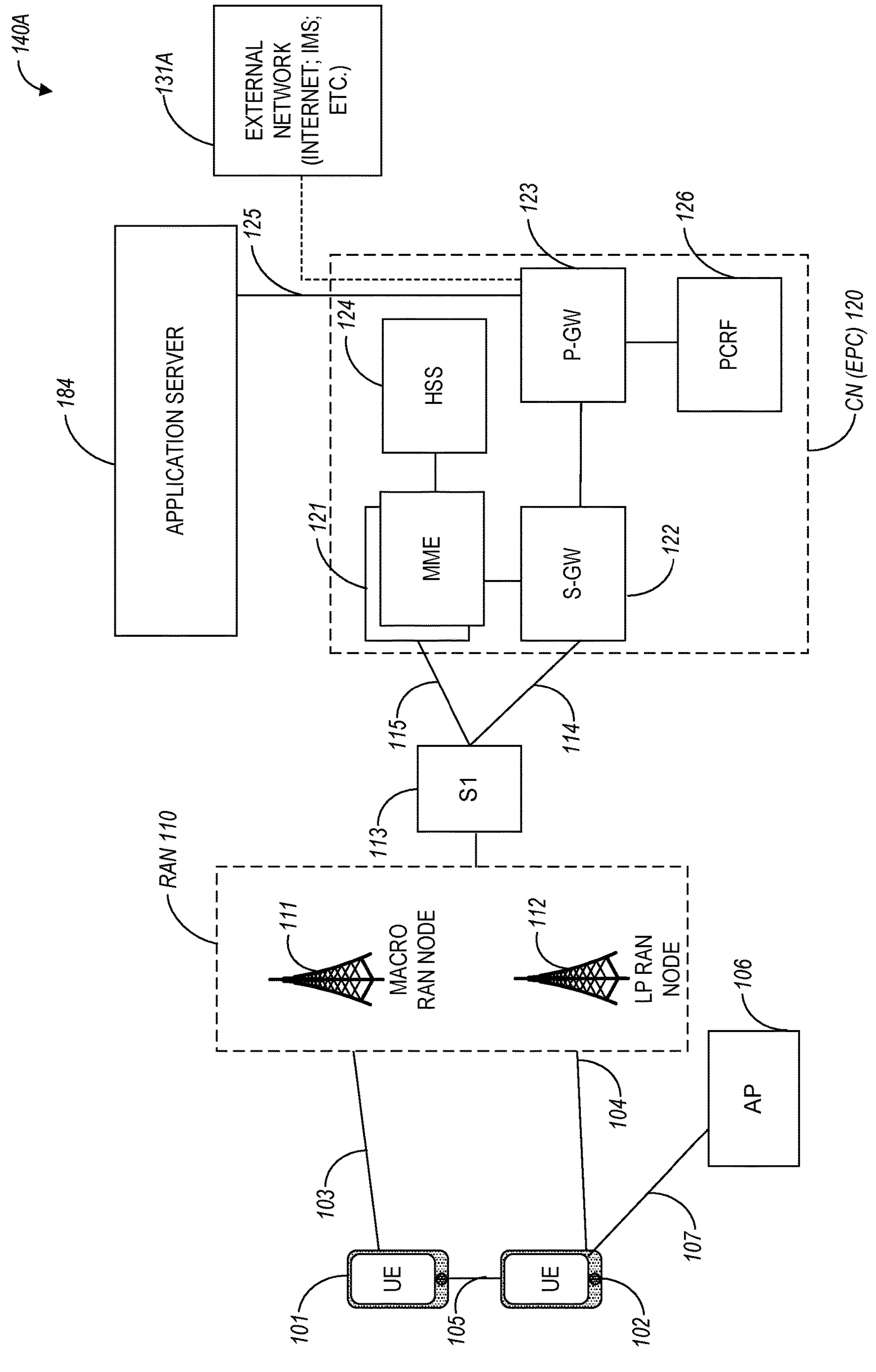
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHZ, 3.6-3.8 GHz, and further frequencies and Spectrum Access System (SAS) in 3.55-3.7 GHZ and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IOT) UE or a Cellular IoT (CIOT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IOT (eNB-IOT) UE and Further Enhanced (FeNB-IOT) UE). An IoT UE can utilize technologies such as machine-to-machine (M2M) or machine-type communications (MTC) for exchanging data with an MTC server or device via a public land mobile network (PLMN), Proximity-Based Service (ProSe), or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, a Universal Mobile Telecommunications System (UMTS), an Evolved Universal Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable connections 103 and 104. These access nodes (ANs) can be referred to as base stations (BSs), NodeBs, evolved NodeBs (eNBs), Next Generation NodeBs (gNBs), RAN network nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112 or an unlicensed spectrum based secondary RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management, and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries user traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and route data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VOIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including a 5G new radio network using communications in the licensed (5G NR) and the unlicensed (5G NR-U) spectrum. One of the current enablers of IoT is the narrowband-IoT (NB-IOT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, a RAN network node, and so forth. In some aspects, a gNB can be a master node (MN) and NG-eNB can be a secondary node (SN) in a 5G architecture. In some aspects, the master/primary node may operate in a licensed band and the secondary node may operate in an unlicensed band.

Figure 1B:
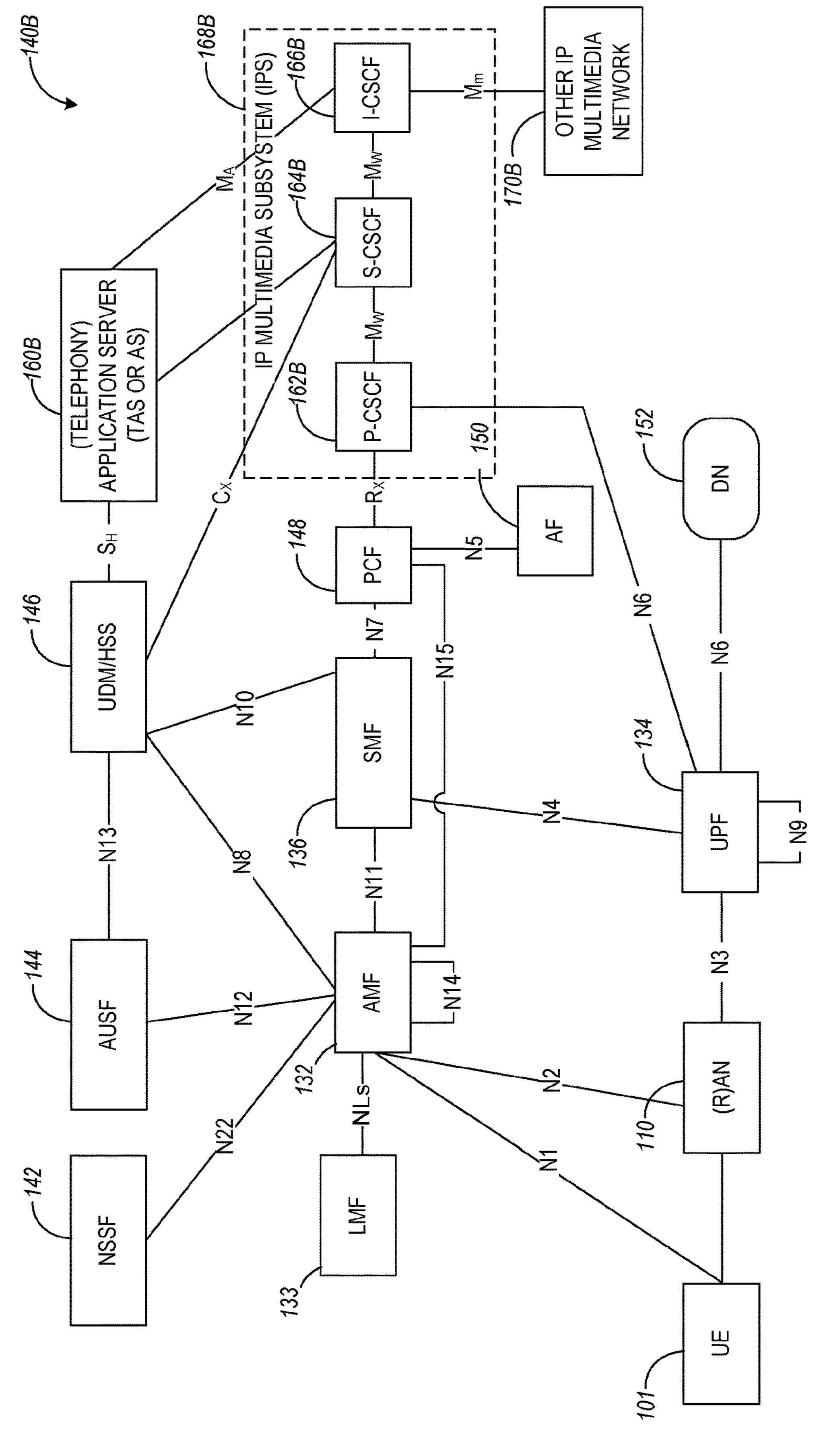
FIG. 1B and FIG. 1C illustrate a non-roaming 5G system architecture in accordance with some aspects.

FIG. 1B illustrates a non-roaming 5G system architecture in accordance with some aspects. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, location management function (LMF) 133, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The LMF 133 may be used in connection with 5G positioning functionalities. In some aspects, LMF 133 receives measurements and assistance information from the next generation radio access network (NG-RAN) 110 and the mobile device (e.g., UE 101) via the AMF 132 over the NLs interface to compute the position of the UE 101. In some aspects, NR positioning protocol A (NRPPa) may be used to carry the positioning information between NG-RAN and LMF 133 over a next generation control plane interface (NG-C). In some aspects, LMF 133 configures the UE using the LTE positioning protocol (LPP) via AMF 132. The NG RAN 110 configures the UE 101 using radio resource control (RRC) protocol over LTE-Uu and NR-Uu interfaces.

In some aspects, the 5G system architecture 140B configures different reference signals to enable positioning measurements. Example reference signals that may be used for positioning measurements include the positioning reference signal (NR PRS) in the downlink and the sounding reference signal (SRS) for positioning in the uplink. The downlink positioning reference signal (PRS) is a reference signal configured to support downlink-based positioning methods.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
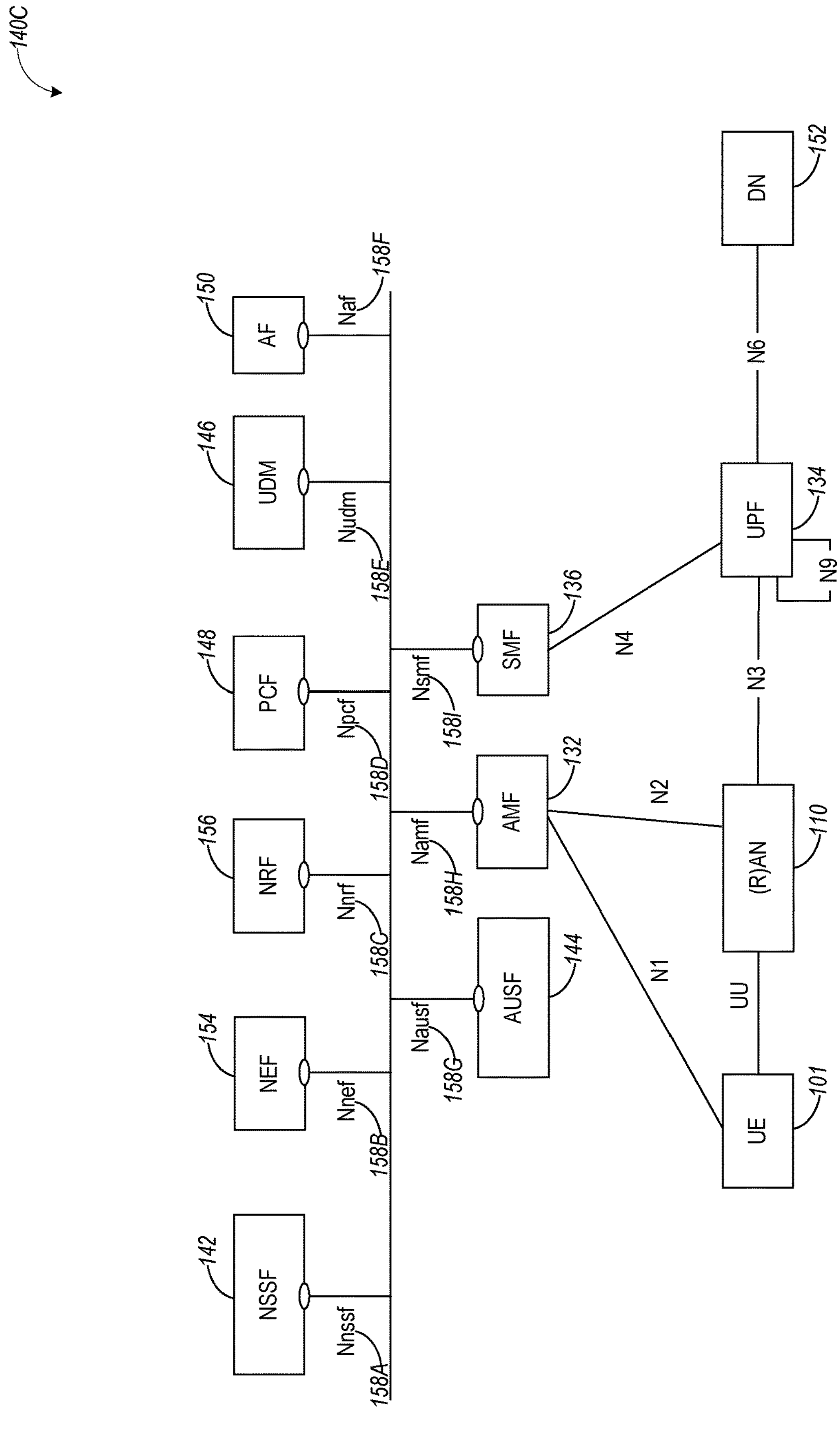

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

Figure 2:
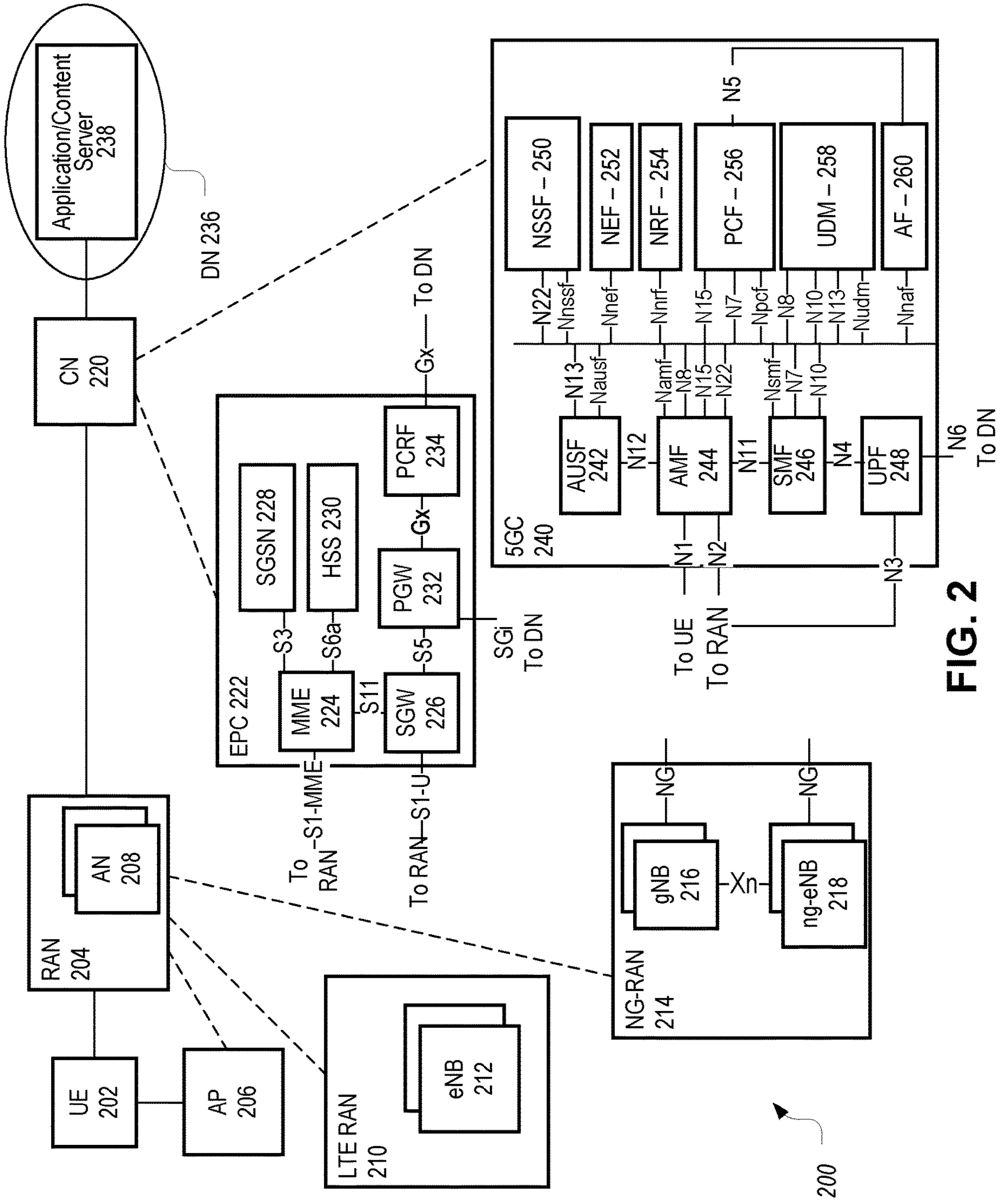
FIG. 2, FIG. 3, and FIG. 4 illustrate various systems, devices, and components that may implement aspects of disclosed embodiments.
Figure 3:
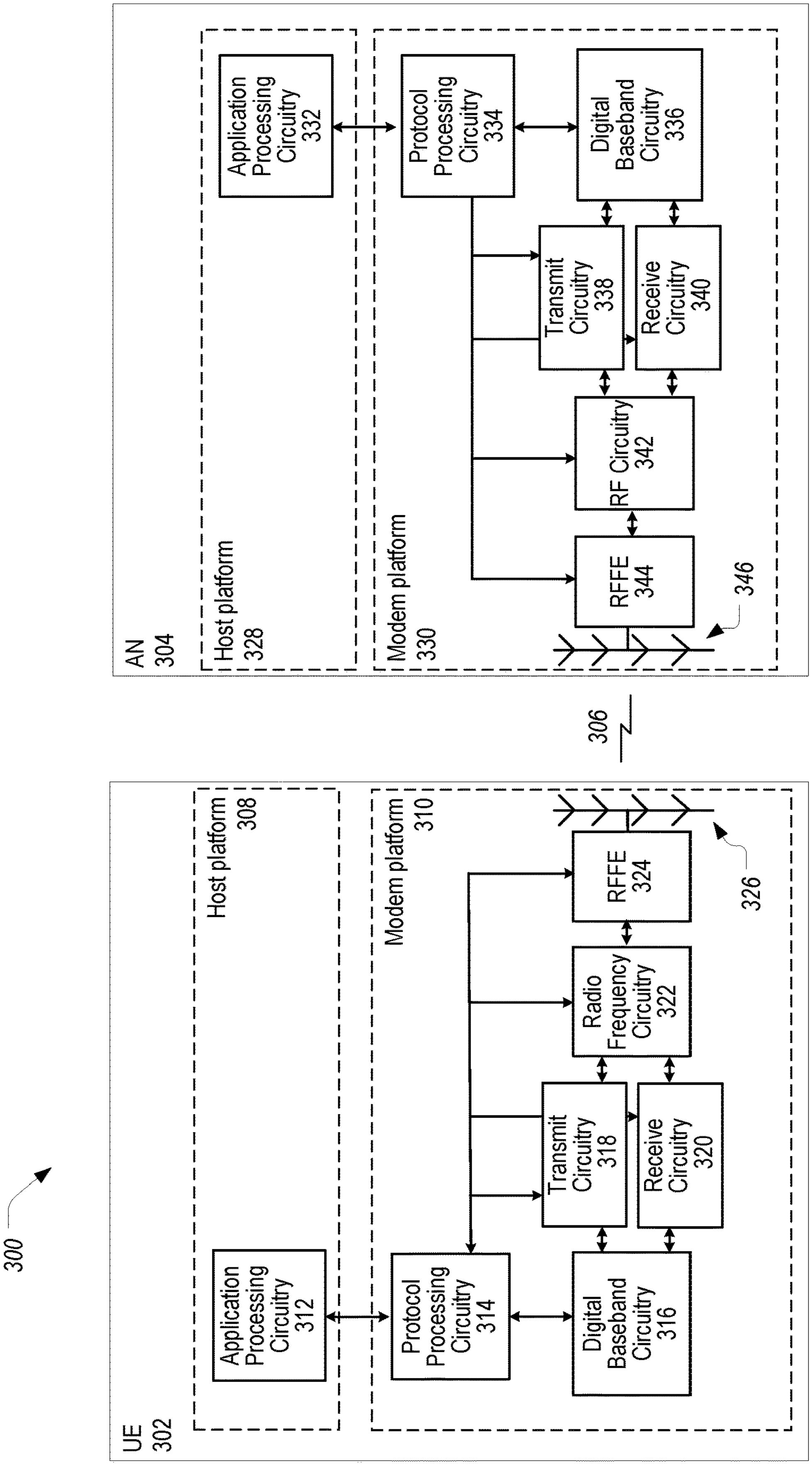
Figure 4:
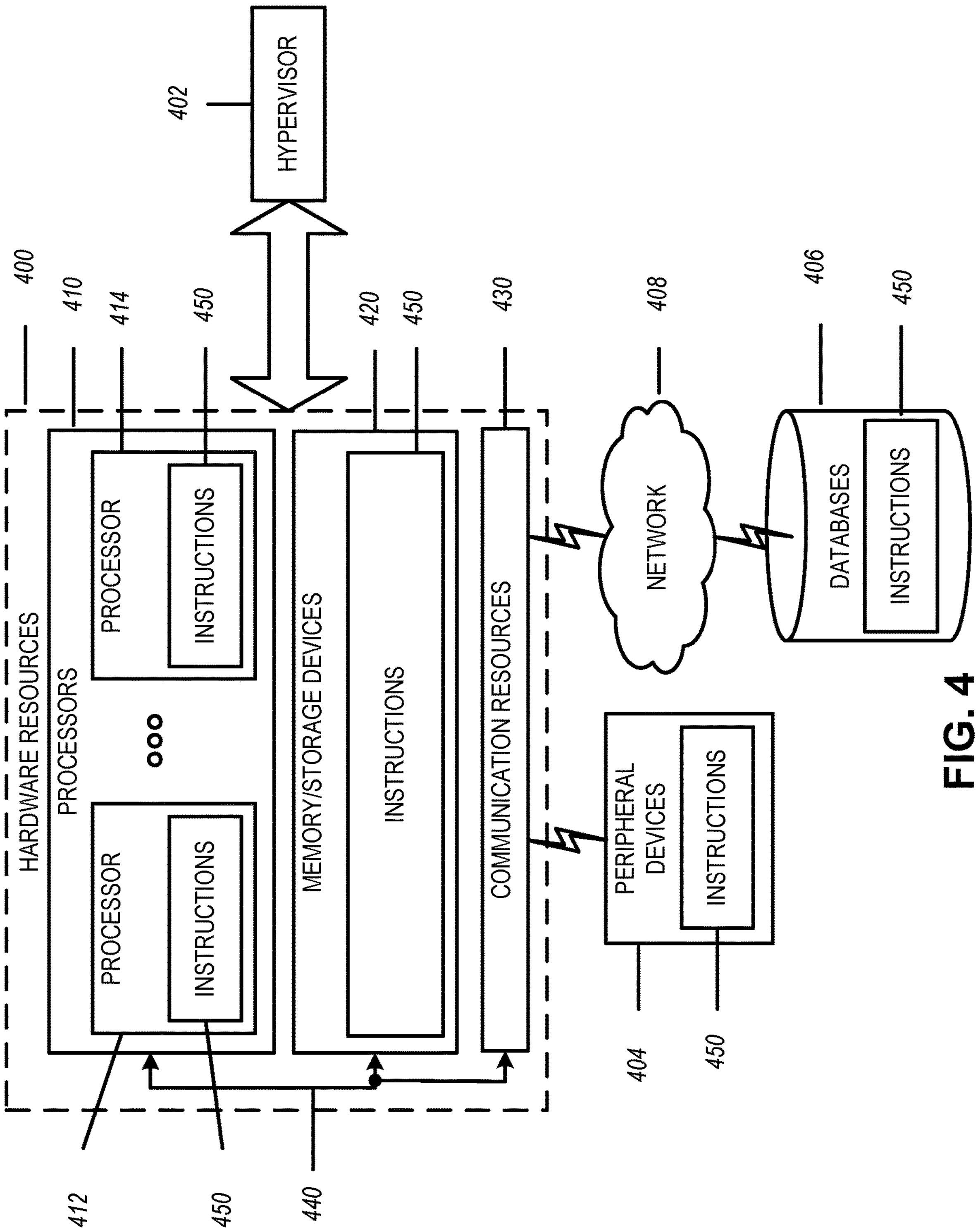

FIG. 2, FIG. 3, and FIG. 4 illustrate various systems, devices, and components that may implement aspects of disclosed embodiments in different communication systems, such as 5G-NR (and beyond) networks. UEs, base stations (such as gNBs), and/or other nodes (e.g., satellites or other NTN nodes) discussed in connection with FIGS. 1A-4 can be configured to perform the disclosed techniques.

FIG. 2 illustrates a network 200 in accordance with various embodiments. The network 200 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 200 may include a UE 202, which may include any mobile or non-mobile computing device designed to communicate with a RAN 204 via an over-the-air connection. The UE 202 may be, but is not limited to, a smartphone, tablet computer, wearable computing device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 200 may include a plurality of UEs coupled directly with one another via a sidelink interface. The UEs may be M2M/D2D devices that communicate using physical sidelink channels such as but not limited to, PSBCH, PSDCH, PSSCH, PSCCH, PSFCH, etc.

In some embodiments, the UE 202 may additionally communicate with an AP 206 via an over-the-air connection. The AP 206 may manage a WLAN connection, which may serve to offload some/all network traffic from the RAN 204. The connection between the UE 202 and the AP 206 may be consistent with any IEEE 802.11 protocol, wherein the AP 206 could be a wireless fidelity (Wi-Fi®) router. In some embodiments, the UE 202, RAN 204, and AP 206 may utilize cellular-WLAN aggregation (for example, LWA/LWIP). Cellular-WLAN aggregation may involve the UE 202 being configured by the RAN 204 to utilize both cellular radio resources and WLAN resources.

The RAN 204 may include one or more access nodes, for example, access node (AN) 208. AN 208 may terminate air-interface protocols for the UE 202 by providing access stratum protocols including RRC, Packet Data Convergence Protocol (PDCP), Radio Link Control (RLC), MAC, and L1 protocols. In this manner, the AN 208 may enable data/voice connectivity between the core network (CN) 220 and the UE 202. In some embodiments, the AN 208 may be implemented in a discrete device or as one or more software entities running on server computers as part of, for example, a virtual network, which may be referred to as a CRAN or virtual baseband unit pool. The AN 208 be referred to as a BS, gNB, RAN node, eNB, ng-eNB, NodeB, RSU, TRxP, TRP, etc. The AN 208 may be a macrocell base station or a low-power base station for providing femtocells, picocells, or other like cells having smaller coverage areas, smaller user capacity, or higher bandwidth compared to macrocells.

In embodiments in which the RAN 204 includes a plurality of ANs, they may be coupled with one another via an X2 interface (if the RAN 204 is an LTE RAN) or an Xn interface (if the RAN 204 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 204 may each manage one or more cells, cell groups, component carriers, etc. to provide the UE 202 with an air interface for network access. The UE 202 may be simultaneously connected with a plurality of cells provided by the same or different ANs of the RAN 204. For example, the UE 202 and RAN 204 may use carrier aggregation to allow the UE 202 to connect with a plurality of component carriers, each corresponding to a Pcell or Scell. In dual connectivity scenarios, a first AN may be a master node that provides an MCG and a second AN may be a secondary node that provides an SCG. The first/second ANs may be any combination of eNB, gNB, ng-eNB, etc.

The RAN 204 may provide the air interface over a licensed spectrum or an unlicensed spectrum. To operate in the unlicensed spectrum, the nodes may use LAA, eLAA, and/or feLAA mechanisms based on CA technology with PCells/Scells. Before accessing the unlicensed spectrum, the nodes may perform medium/carrier-sensing operations based on, for example, a listen-before-talk (LBT) protocol.

In V2X scenarios, the UE 202 or AN 208 may be or act as a roadside unit (RSU), which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high-speed events, such as crash avoidance, traffic warnings, and the like. Additionally, or alternatively, the RSU may provide other cellular/WLAN communications services. The components of the RSU may be packaged in a weatherproof enclosure suitable for outdoor installation and may include a network interface controller to provide a wired connection (e.g., Ethernet) to a traffic signal controller or a backhaul network.

In some embodiments, the RAN 204 may be an LTE RAN 210 with eNBs, for example, eNB 212. The LTE RAN 210 may provide an LTE air interface with the following characteristics: sub-carrier spacing (SCS) of 15 kHz; CP-OFDM waveform for downlink (DL) and SC-FDMA waveform for uplink (UL); turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operate on sub-6 GHz bands.

In some embodiments, the RAN 204 may be an NG-RAN 214 with gNBs, for example, gNB 216, or ng-eNBs, for example, ng-eNB 218. The gNB 216 may connect with 5G-enabled UEs using a 5G NR interface. The gNB 216 may connect with a 5G core through an NG interface, which may include an N2 interface or an N3 interface. The ng-eNB 218 may also connect with the 5G core through an NG interface but may connect with a UE via an LTE air interface. The gNB 216 and the ng-eNB 218 may connect over an Xn interface.

In some embodiments, the NG interface may be split into two parts, an NG user plane (NG-U) interface, which carries traffic data between the nodes of the NG-RAN 214 and a UPF 248 (e.g., N3 interface), and an NG control plane (NG-C) interface, which is a signaling interface between the nodes of the NG-RAN 214 and an AMF 244 (e.g., N2 interface).

The NG-RAN 214 may provide a 5G-NR air interface with the following characteristics: variable SCS; CP-OFDM for DL, CP-OFDM, and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS but may use PBCH DMRS for PBCH demodulation; PTRS for phase tracking for PDSCH and tracking reference signal for time tracking. The 5G-NR air interface may operate on FR1 bands that include sub-6 GHz bands or FR2 bands that include bands from 24.25 GHz to 52.6 GHz. The 5G-NR air interface may include a synchronization signal and physical broadcast channel (SS/PBCH) block (SSB) that is an area of a downlink resource grid that includes PSS/SSS/PBCH.

In some embodiments, the 5G-NR air interface may utilize BWPs (bandwidth parts) for various purposes. For example, BWP can be used for dynamic adaptation of the SCS. For example, the UE 202 can be configured with multiple BWPs where each BWP configuration has a different SCS. When a BWP change is indicated to the UE 202, the SCS of the transmission is changed as well. Another use case example of BWP is related to power saving. In particular, multiple BWPs can be configured for the UE 202 with different amounts of frequency resources (for example, PRBs) to support data transmission under different traffic loading scenarios. A BWP containing a smaller number of PRBs can be used for data transmission with a small traffic load while allowing power saving at the UE 202 and in some cases at the gNB 216. A BWP containing a larger number of PRBs can be used for scenarios with higher traffic loads.

The RAN 204 is communicatively coupled to CN 220 which includes network elements to provide various functions to support data and telecommunications services to customers/subscribers (for example, users of UE 202). The components of the CN 220 may be implemented in one physical node or separate physical nodes. In some embodiments, NFV may be utilized to virtualize any or all of the functions provided by the network elements of the CN 220 onto physical compute/storage resources in servers, switches, etc. A logical instantiation of the CN 220 may be referred to as a network slice, and a logical instantiation of a portion of the CN 220 may be referred to as a network sub-slice.

In some embodiments, the CN 220 may be connected to the LTE radio network as part of the Enhanced Packet System (EPS) 222, which may also be referred to as an EPC (or enhanced packet core). The EPC 222 may include MME 224, SGW 226, SGSN 228, HSS 230, PGW 232, and PCRF 234 coupled with one another over interfaces (or "reference points") as shown. Functions of the elements of the EPC 222 may be briefly introduced as follows.

The MME 224 may implement mobility management functions to track the current location of the UE 202 to facilitate paging, bearer activation/deactivation, handovers, gateway selection, authentication, etc.

The SGW 226 may terminate an S1 interface toward the RAN and route data packets between the RAN and the EPC 222. The SGW 226 may be a local mobility anchor point for inter-RAN node handovers and also may provide an anchor for inter-3GPP mobility. Other responsibilities may include lawful intercept, charging, and some policy enforcement.

The SGSN 228 may track the location of the UE 202 and perform security functions and access control. In addition, the SGSN 228 may perform inter-EPC node signaling for mobility between different RAT networks; PDN and S-GW selection as specified by MME 224; MME selection for handovers; etc. The S3 reference point between the MME 224 and the SGSN 228 may enable user and bearer information exchange for inter-3GPP access network mobility in idle/active states.

The HSS 230 may include a database for network users, including subscription-related information to support the network entities' handling of communication sessions. The HSS 230 can provide support for routing/roaming, authentication, authorization, naming/addressing resolution, location dependencies, etc. An S6a reference point between the HSS 230 and the MME 224 may enable the transfer of subscription and authentication data for authenticating/authorizing user access to the LTE CN 220.

The PGW 232 may terminate an SGi interface toward a data network (DN) 236 that may include an application/content server 238. The PGW 232 may route data packets between the LTE CN 220 and the data network 236. The PGW 232 may be coupled with the SGW 226 by an S5 reference point to facilitate user plane tunneling and tunnel management. The PGW 232 may further include a node for policy enforcement and charging data collection (for example, PCEF). Additionally, the SGi reference point between the PGW 232 and the data network 236 may be an operator external public, a private PDN, or an intra-operator packet data network, for example, for provision of IMS services. The PGW 232 may be coupled with a PCRF 234 via a Gx reference point.

The PCRF 234 is the policy and charging control element of the LTE CN 220. The PCRF 234 may be communicatively coupled to the app/content server 238 to determine appropriate QoS and charging parameters for service flows. The PCRF 234 may provision associated rules into a PCEF (via Gx reference point) with appropriate TFT and QCI.

In some embodiments, the CN 220 may be a 5GC 240. The 5GC 240 may include an AUSF 242, AMF 244, SMF 246, UPF 248, NSSF 250, NEF 252, NRF 254, PCF 256, UDM 258, and AF 260 coupled with one another over interfaces (or "reference points") as shown. Functions of the elements of the 5GC 240 may be briefly introduced as follows.

The AUSF 242 may store data for authentication of UE 202 and handle authentication-related functionality. The AUSF 242 may facilitate a common authentication framework for various access types. In addition to communicating with other elements of the 5GC 240 over reference points as shown, the AUSF 242 may exhibit a Nausf service-based interface.

The AMF 244 may allow other functions of the 5GC 240 to communicate with the UE 202 and the RAN 204 and to subscribe to notifications about mobility events with respect to the UE 202. The AMF 244 may be responsible for registration management (for example, for registering UE 202), connection management, reachability management, mobility management, lawful interception of AMF-related events, and access authentication and authorization. The AMF 244 may provide transport for SM messages between the UE 202 and the SMF 246, and act as a transparent proxy for routing SM messages. AMF 244 may also provide transport for SMS messages between UE 202 and an SMSF. AMF 244 may interact with the AUSF 242 and the UE 202 to perform various security anchor and context management functions. Furthermore, AMF 244 may be a termination point of a RAN CP interface, which may include or be an N2 reference point between the RAN 204 and the AMF 244; and the AMF 244 may be a termination point of NAS (N1) signaling, and perform NAS ciphering and integrity protection. AMF 244 may also support NAS signaling with the UE 202 over an N3 IWF interface.

The SMF 246 may be responsible for SM (for example, session establishment, tunnel management between UPF 248 and AN 208); UE IP address allocation and management (including optional authorization); selection and control of UP function; configuring traffic steering at UPF 248 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 244 over N2 to AN 208; and determining SSC mode of a session. SM may refer to the management of a PDU session, and a PDU session or "session" may refer to a PDU connectivity service that provides or enables the exchange of PDUs between the UE 202 and the data network 236.

The UPF 248 may act as an anchor point for intra-RAT and inter-RAT mobility, an external PDU session point of interconnecting to data network 236, and a branching point to support multi-homed PDU sessions. The UPF 248 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 248 may include an uplink classifier to support routing traffic flows to a data network.

The NSSF 250 may select a set of network slice instances serving the UE 202. The NSSF 250 may also determine allowed NSSAI and the mapping to the subscribed S-NSSAIs if needed. The NSSF 250 may also determine the AMF set to be used to serve the UE 202, or a list of candidate AMFs based on a suitable configuration and possibly by querying the NRF 254. The selection of a set of network slice instances for the UE 202 may be triggered by the AMF 244 with which the UE 202 is registered by interacting with the NSSF 250, which may lead to a change of AMF. The NSSF 250 may interact with the AMF 244 via an N22 reference point; and may communicate with another NSSF in a visited network via an N31 reference point (not shown). Additionally, the NSSF 250 may exhibit an Nnssf service-based interface.

The NEF 252 may securely expose services and capabilities provided by 3GPP network functions for the third party, internal exposure/re-exposure, AFs (e.g., AF 260), edge computing or fog computing systems, etc. In such embodiments, the NEF 252 may authenticate, authorize, or throttle the AFs. NEF 252 may also translate information exchanged with the AF 260 and information exchanged with internal network functions. For example, the NEF 252 may translate between an AF-Service-Identifier and an internal 5GC information. NEF 252 may also receive information from other NFs based on the exposed capabilities of other NFs. This information may be stored at the NEF 252 as structured data, or a data storage NF using standardized interfaces. The stored information can then be re-exposed by the NEF 252 to other NFs and AFs, or used for other purposes such as analytics. Additionally, the NEF 252 may exhibit a Nnef service-based interface.

The NRF 254 may support service discovery functions, receive NF discovery requests from NF instances, and provide the information of the discovered NF instances to the NF instances. NRF 254 also maintains information on available NF instances and their supported services. As used herein, the terms "instantiate," "instantiation," and the like may refer to the creation of an instance, and an "instance" may refer to a concrete occurrence of an object, which may occur, for example, during the execution of program code. Additionally, the NRF 254 may exhibit the Nnrf service-based interface.

The PCF 256 may provide policy rules to control plane functions to enforce them, and may also support a unified policy framework to govern network behavior. The PCF 256 may also implement a front end to access subscription information relevant for policy decisions in a UDR of the UDM 258. In addition to communicating with functions over reference points as shown, the PCF 256 exhibits an Npcf service-based interface.

The UDM 258 may handle subscription-related information to support the network entities' handling of communication sessions and may store the subscription data of UE 202. For example, subscription data may be communicated via an N8 reference point between the UDM 258 and the AMF 244. The UDM 258 may include two parts, an application front end, and a UDR. The UDR may store subscription data and policy data for the UDM 258 and the PCF 256, and/or structured data for exposure and application data (including PFDs for application detection, application request information for multiple UEs 202) for the NEF 252. The Nudr service-based interface may be exhibited by the UDR to allow the UDM 258, PCF 256, and NEF 252 to access a particular set of the stored data, as well as to read, update (e.g., add, modify), delete, and subscribe to the notification of relevant data changes in the UDR. The UDM may include a UDM-FE, which is in charge of processing credentials, location management, subscription management, and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 258 may exhibit the Nudm service-based interface.

The AF 260 may provide application influence on traffic routing, provide access to NEF, and interact with the policy framework for policy control.

In some embodiments, the 5GC 240 may enable edge computing by selecting operator/3rd party services to be geographically close to a point that the UE 202 is attached to the network. This may reduce latency and load on the network. To provide edge-computing implementations, the 5GC 240 may select a UPF 248 close to the UE 202 and execute traffic steering from the UPF 248 to data network 236 via the N6 interface. This may be based on the UE subscription data, UE location, and information provided by the AF 260. In this way, the AF 260 may influence UPF (re)selection and traffic routing. Based on operator deployment, when AF 260 is considered to be a trusted entity, the network operator may permit AF 260 to interact directly with relevant NFs. Additionally, the AF 260 may exhibit a Naf service-based interface.

The data network 236 may represent various network operator services, Internet access, or third-party services that may be provided by one or more servers including, for example, application/content server 238.

FIG. 3 schematically illustrates a wireless network 300 in accordance with various embodiments. The wireless network 300 may include a UE 302 in wireless communication with AN 304. The UE 302 and AN 304 may be similar to, and substantially interchangeable with, like-named components described elsewhere herein.

The UE 302 may be communicatively coupled with the AN 304 via connection 306. The connection 306 is illustrated as an air interface to enable communicative coupling and can be consistent with cellular communications protocols such as an LTE protocol or a 5G NR protocol operating at mm Wave or sub-6 GHz frequencies.

The UE 302 may include a host platform 308 coupled with a modem platform 310. The host platform 308 may include application processing circuitry 312, which may be coupled with protocol processing circuitry 314 of the modem platform 310. The application processing circuitry 312 may run various applications for the UE 302 that source/sink application data. The application processing circuitry 312 may further implement one or more layer operations to transmit/receive application data to/from a data network. These layer operations may include transport (for example UDP) and Internet (for example, IP) operations The protocol processing circuitry 314 may implement one or more layer operations to facilitate transmission or reception of data over the connection 306. The layer operations implemented by the protocol processing circuitry 314 may include, for example, MAC, RLC, PDCP, RRC, and NAS operations.

The modem platform 310 may further include digital baseband circuitry 316 that may implement one or more layer operations that are "below" layer operations performed by the protocol processing circuitry 314 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 310 may further include transmit circuitry 318, receive circuitry 320, RF circuitry 322, and RF front end (RFFE) 324, which may include or connect to one or more antenna panels 326. Briefly, the transmit circuitry 318 may include a digital-to-analog converter, mixer, intermediate frequency (IF) components, etc.; the receive circuitry 320 may include an analog-to-digital converter, mixer, IF components, etc.; the RF circuitry 322 may include a low-noise amplifier, a power amplifier, power tracking components, etc.; RFFE 324 may include filters (for example, surface/bulk acoustic wave filters), switches, antenna tuners, beamforming components (for example, phase-array antenna components), etc. The selection and arrangement of the components of the transmit circuitry 318, receive circuitry 320, RF circuitry 322, RFFE 324, and antenna panels 326 (referred generically as "transmit/receive components") may be specific to details of a specific implementation such as, for example, whether the communication is TDM or FDM, in mmWave or sub-6 GHz frequencies, etc. In some embodiments, the transmit/receive components may be arranged in multiple parallel transmit/receive chains, may be disposed of in the same or different chips/modules, etc.

In some embodiments, the protocol processing circuitry 314 may include one or more instances of control circuitry (not shown) to provide control functions for the transmit/receive components.

A UE reception may be established by and via the antenna panels 326, RFFE 324, RF circuitry 322, receive circuitry 320, digital baseband circuitry 316, and protocol processing circuitry 314. In some embodiments, the antenna panels 326 may receive a transmission from the AN 304 by receive-beamforming signals received by a plurality of antennas/antenna elements of the one or more antenna panels 326.

A UE transmission may be established by and via the protocol processing circuitry 314, digital baseband circuitry 316, transmit circuitry 318, RF circuitry 322, RFFE 324, and antenna panels 326. In some embodiments, the transmit components of the UE 302 may apply a spatial filter to the data to be transmitted to form a transmit beam emitted by the antenna elements of the antenna panels 326.

Similar to the UE 302, the AN 304 may include a host platform 328 coupled with a modem platform 330. The host platform 328 may include application processing circuitry 332 coupled with protocol processing circuitry 334 of the modem platform 330. The modem platform may further include digital baseband circuitry 336, transmit circuitry 338, receive circuitry 340, RF circuitry 342, RFFE circuitry 344, and antenna panels 346. The components of the AN 304 may be similar to and substantially interchangeable with like-named components of the UE 302. In addition to performing data transmission/reception as described above, the components of the AN 304 may perform various logical functions that include, for example, RNC functions such as radio bearer management, uplink and downlink dynamic radio resource management, and data packet scheduling.

FIG. 4 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 4 shows a diagrammatic representation of hardware resources 400 including one or more processors (or processor cores) 410, one or more memory/storage devices 420, and one or more communication resources 430, each of which may be communicatively coupled via a bus 440 or other interface circuitry. For embodiments where node virtualization (e.g., NFV) is utilized, a hypervisor 402 may be executed to provide an execution environment for one or more network slices/sub-slices to utilize the hardware resources 400.

The processors 410 may include, for example, a processor 412 and a processor 414. The processors 410 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 420 may include a main memory, disk storage, or any suitable combination thereof. The memory/storage devices 420 may include but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 430 may include interconnection or network interface controllers, components, or other suitable devices to communicate with one or more peripheral devices 404 or one or more databases 406 or other network elements via a network 408. For example, the communication resources 430 may include wired communication components (e.g., for coupling via USB, Ethernet, etc.), cellular communication components, NFC components, Bluetooth® (or Bluetooth® Low Energy) components, Wi-Fi® components, and other communication components.

Instructions 450 may comprise software, a program, an application, an applet, an app, or other executable code for causing at least any of the processors 410 to perform any one or more of the methodologies discussed herein. The instructions 450 may reside, completely or partially, within at least one of the processors 410 (e.g., within the processor's cache memory), the memory/storage devices 420, or any suitable combination thereof. Furthermore, any portion of the instructions 450 may be transferred to the hardware resources 400 from any combination of the peripheral devices 404 or the databases 406. Accordingly, the memory of processors 410, the memory/storage devices 420, the peripheral devices 404, and the databases 406 are examples of computer-readable and machine-readable media.

For one or more embodiments, at least one of the components outlined in one or more of the preceding figures may be configured to perform one or more operations, techniques, processes, and/or methods as outlined in the example sections below. For example, baseband circuitry associated with one or more of the preceding figures may be configured to operate in accordance with one or more of the examples set forth below. For another example, circuitry associated with a UE, base station, satellite, network element, etc. as described above in connection with one or more of the preceding figures may be configured to operate in accordance with one or more of the examples set forth below in the example section.

The term "application" may refer to a complete and deployable package, environment to achieve a certain function in an operational environment. The term "AI/ML application" or the like may be an application that contains some artificial intelligence (AI)/machine learning (ML) models and application-level descriptions. In some embodiments, an AI/ML application may be used for configuring or implementing one or more of the disclosed aspects.

The term "machine learning" or "ML" refers to the use of computer systems implementing algorithms and/or statistical models to perform a specific task(s) without using explicit instructions but instead relying on patterns and inferences. ML algorithms build or estimate mathematical model(s) (referred to as "ML models" or the like) based on sample data (referred to as "training data," "model training information," or the like) to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the present disclosure.

The term "machine learning model," "ML model," or the like may also refer to ML methods and concepts used by an ML-assisted solution. An "ML-assisted solution" is a solution that addresses a specific use case using ML algorithms during operation. ML models include supervised learning (e.g., linear regression, k-nearest neighbor (KNN), decision tree algorithms, support machine vectors, Bayesian algorithm, ensemble algorithms, etc.) unsupervised learning (e.g., K-means clustering, principal component analysis (PCA), etc.), reinforcement learning (e.g., Q-learning, multi-armed bandit learning, deep RL, etc.), neural networks, and the like. Depending on the implementation a specific ML model could have many sub-models as components and the ML model may train all sub-models together. Separately trained ML models can also be chained together in an ML pipeline during inference. An "ML pipeline" is a set of functionalities, functions, or functional entities specific for an ML-assisted solution; an ML pipeline may include one or several data sources in a data pipeline, a model training pipeline, a model evaluation pipeline, and an actor. The "actor" is an entity that hosts an ML-assisted solution using the output of the ML model inference). The term "ML training host" refers to an entity, such as a network function, that hosts the training of the model. The term "ML inference host" refers to an entity, such as a network function, that hosts the model during inference mode (which includes both the model execution as well as any online learning if applicable). The ML-host informs the actor about the output of the ML algorithm, and the actor decides for an action (an "action" is performed by an actor as a result of the output of an ML-assisted solution). The term "model inference information" refers to information used as an input to the ML model for determining inference(s); the data used to train an ML model and the data used to determine inferences may overlap, however, "training data" and "inference data" refer to different concepts.

5G NR 3GPP technical specifications (TSs) support a diverse set of verticals and use cases, including enhanced mobile broadband (eMBB) as well as the newly introduced URLLC services. Support for Low Power Wide Area (LPWA) networks and use cases for extremely low complexity/cost devices, targeting extreme coverage and ultra-long battery lifetimes, are expected to be served by MTC (Category M UEs) and NB-IOT (Category NB UEs) technologies.

In some aspects, the disclosed techniques may be used to support a class of NR UEs with complexity and power consumption levels lower than Rel-15 NR UEs, catering to use cases like industrial wireless sensor networks (IWSN), a certain class of wearables, and video surveillance, to fill the gap between current LPWA solutions and eMBB solutions in NR and also to further facilitate a smooth migration from 3.5G and 4G technologies to 5G (NR) technology for currently deployed bands serving relevant use cases requiring relatively low-to-moderate reference (e.g., median) and peak user throughputs, low device complexity, small device form factors, and relatively long battery lifetimes.

Towards the above, a class of Reduced Capability (RedCap) NR User Equipment (UE) is expected to be defined that can be served using the currently specified 5G NR framework with necessary adaptations and enhancements to limit device complexity and power consumption while minimizing any adverse impact to network resource utilization, system spectral efficiency, and operation efficiency. In some aspects, RedCap UEs may support a maximum UE BW of 20 MHz in frequency range 1 (FR1) bands and a maximum UE BW of 100 MHz in FR2 bands.

The disclosed techniques include methods for Bandwidth Part (BWP) operations for RedCap UEs in RRC_IDLE or RRC_INACTIVE modes considering coexistence with non-RedCap UEs and the BW restrictions for RedCap UEs. In particular, the disclosed techniques include methods for BWP configuration and operations for RedCap UEs when: (a) RedCap UEs may be provided with an additional DL BWP for at least some common control reception in Idle/inactive modes; (b) RedCap UEs may be provided with separate configuration of initial UL BWP that may be different from non-RedCap UEs, and (c) RedCap UEs configured with Paging Early Indication (PEI) or TRS/CSI-RS configurations in RRC_IDLE/INACTIVE modes.

System Information Block 1 (SIB1) and SIBx (x>1) Reception

The reception of SIB1 and SIBx (x>1) can be common for RedCap and non-RedCap UEs and limited to within CORESET #0 as defined by a Master Information Block (MIB).

A Separate CORESET and DL BWP for Paging or Random Access for RedCap UEs

Figure 5:
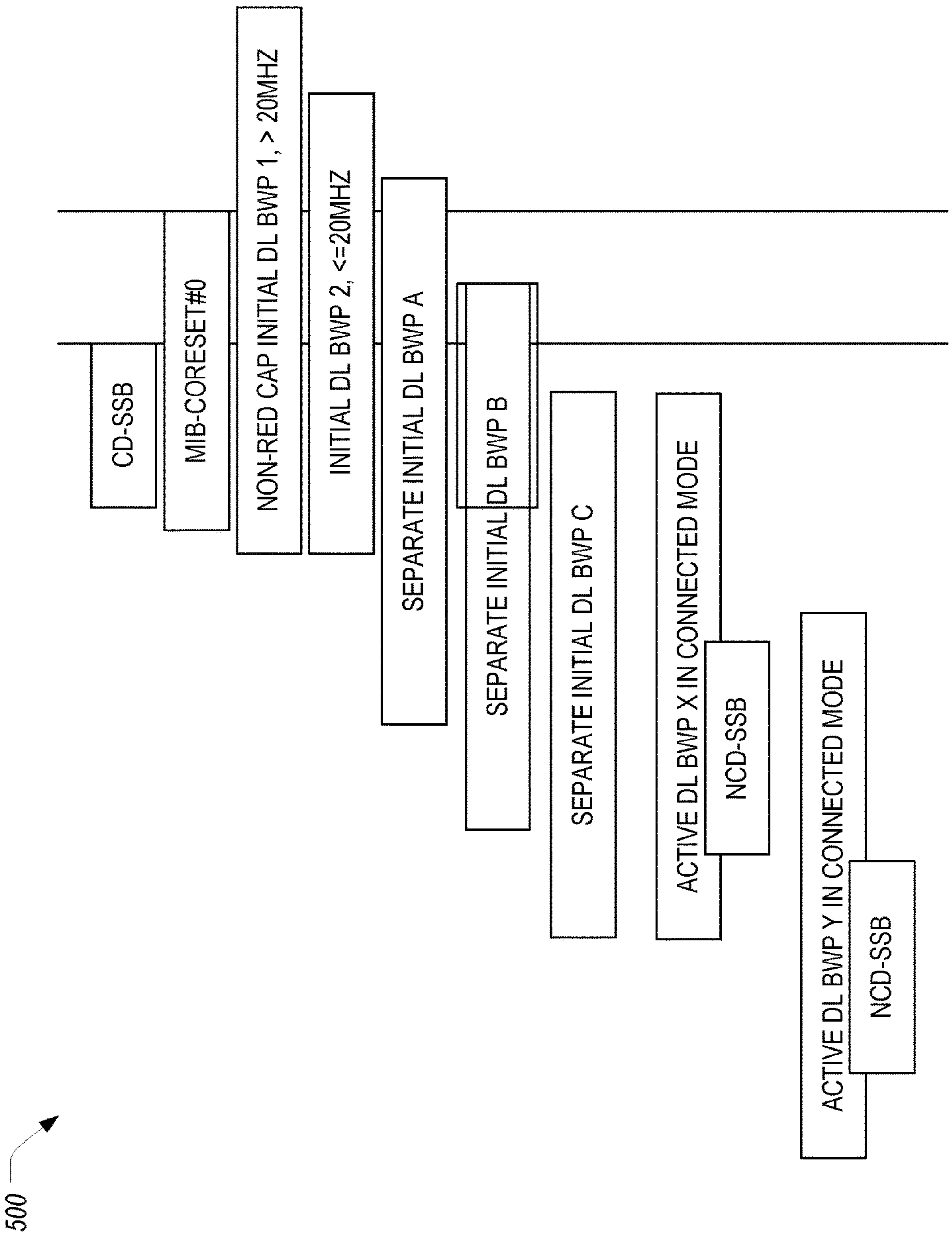
FIG. 5 illustrates a diagram of example separate initial downlink (DL) BWP configuration options, in accordance with some aspects.

FIG. 5 illustrates diagram 500 of example separate initial DL BWP configuration options, in accordance with some aspects. More specifically, FIG. 5 illustrates examples of separate initial DL BWP configuration options (e.g., a separate iDL BWP A, B, C). The illustrated "active DL BWP X/Y in connected mode" are examples of RRC-configured DL BWPs in a connected mode that may not include CD-SSB entirely. In such cases, a UE that does not indicate support of operation without SSB in an RRC-configured DL BWP expects NCD-SSB in the "Active DL BWP X/Y" respectively.

Figure 6:
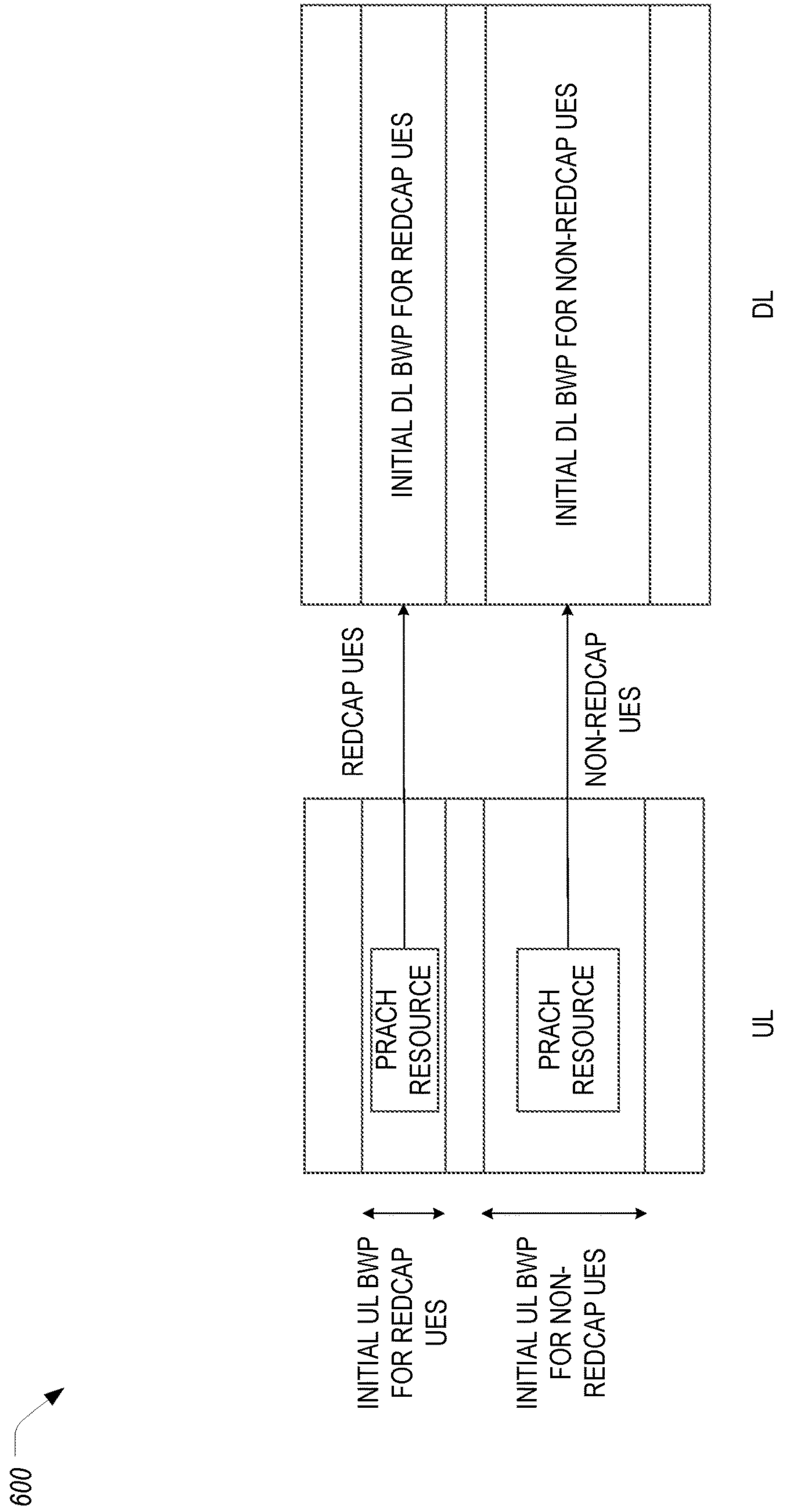
FIG. 6 illustrates different physical random access channel (PRACH) resources for RedCap and non-RedCap UEs in different initial uplink (UL) BWPs, in accordance with some aspects.

FIG. 6 illustrates a diagram 600 of different PRACH resources for RedCap and non-RedCap UEs in different initial UL BWPs, in accordance with some aspects. As illustrated in FIG. 6, separate initial DL BWP may also be provided to RedCap UEs to align center frequency between initial DL and UL BWPs for RedCap UEs. In FIG. 6, the "Initial DL BWP for non-RedCap UEs" corresponds to the MIB-indicated "CORESET #0".

In some aspects, PDCCH Type 2 common search space (CSS) for paging and the associated PDSCH can be limited to CORESET #0 of the primary cell.

In some aspects, for RedCap UEs, an additional CORESET referred to as CORESET #0A defined in an additional DL BWP (may also be referred to as "separate initial DL BWP"), may be configured via a System Information Block (SIB) message, primarily for offloading of common control and avoid congestion in CORESET #0. In an example, it can be configured via SIB1.

In some embodiments, an additional CORESET (CORESET #0A) may be defined within an additional DL BWP (may also be referred to as "separate initial DL BWP"), referred to as DL BWP #0A, for the reception of PDCCH and PDSCH for paging monitoring. As another example, the DL BWP #0A may be used for reception of some or all PDCCH and PDSCH associated with random access procedures, namely, one or more of PDCCH Type 1 CSS for scheduling of PDSCH carrying Msg2, scheduling of retransmission of PUSCH carrying Msg3, and scheduling of PDSCH carrying Msg4.

In time-division duplex (TDD) deployments, the center frequencies of the DL and UL BWPs with the same BWP index that are configured at the same time can be the same. In an embodiment, for unpaired spectrum (TDD deployments), a UE may be configured with DL BWP #0A that may have a center frequency different from the center frequency of UL BWP #0. In such a case, the UE would need to perform RF frequency retuning during any transition between reception in the DL and transmission in the UL. Accordingly, in an example of the embodiment, frequency retuning gaps may be specified between the last DL symbol in which the UE may receive DL physical channels or signals and a first UL symbol used for transmission from the UE and vice-versa, in addition to the Rx-to-Tx and Tx-to-Rx switching times respectively that are currently specified (e.g., in 3GPP TS 38.211). The frequency retuning gaps may be defined in numbers of OFDM Symbols (OSs) or in units of time.

In some embodiments, the size of the DCI format 1_0 monitored in a CSS is determined based on the size of CORESET #0 when CORESET #0 is configured in the cell and based on the size of initial DL BWP if CORESET #0 is not configured in the cell. For RedCap UEs provided with a CORESET #0A at least for one of paging or random access, it is also necessary to monitor for DCI format 1_0 with its Cyclic Redundancy Check (CRC) scrambled with SI-RNTI for reception of System Information (SI) messages. In general, this can result in two sizes for DCI format 1_0 monitoring in a CSS if the sizes of CORESET #0 and CORESET #0A are different.

In some embodiments, when provided with a CORESET #0A for one or more of paging- and random access-related DL receptions, the size of CORESET #0A in the frequency domain may be constrained to be the same as that for CORESET #0. Consequently, the size of the DCI format 1_0 may be determined according to either CORESET #0 or CORESET #0A size in the frequency domain. Further, note that both DL BWP #0 and DL BWP #0A can be assumed to be configured with the same subcarrier spacing (SCS). Alternatively, the sizes of CORESET #0 and CORESET #0A may be different, and the size of DCI format 1_0 monitored in a CSS may be determined according to CORESET #0. In this case, in an example, for scheduling of paging PDSCH, Msg2 PDSCH, or Msg4 PDSCH, the Frequency Domain Resource Allocation (FDRA) may be determined by the UE by applying truncation of several most significant bits (MSBs) or by applying zero-padding (appending zeros) to the received bit-field in DCI format 1_0 received in a Type 2 CSS (for paging) or Type 1 CSS (for random access related PDSCH reception) depending on whether the BW of CORESET #0 is larger or smaller than that of CORESET #0A respectively.

In some aspects, when configured with CORESET #0A, DL BWP #0A for paging reception, and when in RRC_CONNECTED mode, a UE may be expected to monitor for PDCCH Type 2 CSS (indicated by pagingSearchSpace) in CORESET #0A as long as the all PRBs of the CORESET #0A are contained within the active DL BWP of the UE and the active DL BWP and the separate initial DL BWP have the same subcarrier spacing (SCS).

In some embodiments, when in RRC_CONNECTED mode, if PDCCH Type 1 CSS (indicated by ra-SearchSpace) is indicated to map to CORESET #0A instead of CORESET #0, a UE may be expected to monitor for PDCCH Type 1 CSS (indicated by ra-SearchSpace) in CORESET #0A as long as the all PRBs of the CORESET #0A are contained within the active DL BWP of the UE and the active DL BWP and the separate initial DL BWP have the same subcarrier spacing (SCS).

In some embodiments, when provided with CORESET #0A, for a CORESET with index 0A, the UE may assume that a DM-RS antenna port for PDCCH receptions in the CORESET is quasi co-located (QCL-ed) with the one or more DL RS configured by a TCI state, where the TCI state is indicated by a MAC CE activation command for the CORESET if any. Alternatively, a SS/PBCH block the UE identified during a most recent random access procedure not initiated by a PDCCH order that triggers a contention-free random access procedure if no MAC CE activation command indicating a TCI state for the CORESET is received after the most recent random access procedure.

In some embodiments, for a CORESET with index 0A, a UE may expect that a CSI-RS configured with qclType set to 'typeD' in a TCI state indicated by a MAC CE activation command for the CORESET is provided by a SS/PBCH block. If the UE receives a MAC CE activation command for one of the TCI states, the UE applies the activation command in the first slot that is after slot k+3Nslotsubframe,μ where k is the slot where the UE would transmit a PUCCH with HARQ-ACK information for the PDSCH providing the activation command and μ is the SCS configuration for the PUCCH. The active BWP is defined as the active BWP in the slot when the activation command is applied.

In some aspects, the span in the frequency domain for CORESET #0A is the same as that for the separate initial DL BWP (DL BWP #0A). Alternatively, the span in the frequency domain for CORESET #0A may be smaller than (that is, a proper sub-set of) the span in the frequency domain for DL BWP #0A.

In some embodiments, a RedCap UE may expect configuration of Synchronization Signal Block (SSB) in a separate initial DL BWP (DL BWP #0A) that is configured via SIB signaling with Type 1 PDCCH CSS for random access related DL reception for RedCap UEs if the DL BWP #0A is also configured with Type 2 PDCCH CSS for paging reception, where the SSB periodicity and indexing are identical to the Cell Defining SSB (CD-SSB) for the camping or serving cell but located with non-zero offsets from the NR frequency raster in the frequency domain.

Alternatively, in some aspects, the SSB periodicity may be different from that of the CD-SSB. In a further example, for same or longer periodicity values compared to the CD-SSB, the SSB occasions in the separate initial DL BWP may be the same or a proper subset of the SSB occasions for the CD-SSB.

In another embodiment, a RedCap UE that is not capable of supporting operations in an active DL BWP without SSB, when in RRC_CONNECTED state, may expect either of the following to be configured within the active DL BWP: (1) the CD-SSB, or (2) the SSB configured within the separate initial DL BWP (DL BWP #0A), or (3) a separate configuration of non-cell defining-SSB.

In some embodiments, a RedCap UE may expect configuration of Synchronization Signal Block (SSB) and configurations for Types 0 and 0A for Remaining Minimum System Information (RMSI) and Other System Information (OSI) respectively in a separate initial DL BWP (DL BWP #0A) that is configured via SIB signaling with Type 1 PDCCH CSS for random access related DL reception for RedCap UEs if the DL BWP #0A is also configured with Type 2 PDCCH CSS for paging reception, where the SSB periodicity and indexing are identical to the Cell Defining SSB (CD-SSB) for the camping or serving cell but located with non-zero offsets from the NR synchronization raster in the frequency domain. Thus, although the SSB in DL BWP #0A may also be associated with an RMSI, such an SSB may not be interpreted as a Cell Defining SSB (CD-SSB) as it is not located on the synchronization raster.

In some aspects, a RedCap UE may be provided with configurations of Types 0 or 0A PDCCH CSS with monitoring occasions (MOs) that are the same as that defined for CORESET #0. Alternatively, the MOs for Types 0/0A PDCCH CSS sets in CORESET #0A in separate initial DL BWP may be provided to a RedCap UE independent of the monitoring occasions for Type 0/0A PDCCH CSS sets in CORESET #0. In a further example, the signaling of the configuration for Type 0 PDCCH CSS is provided to the UE using 4 bits as used via Master Information Block (MIB) signaling for CORESET #0 defined by MIB. In another example, a RedCap UE may assume the same System Information (SI) monitoring window configuration, which includes time offset, duration, and periodicity, as that for CORESET #0. Alternatively, the SI monitoring window configuration may be separately provided to the UE via SIB1 and may differ from that for CORESET #0.

In some embodiments, the multiplexing between the SSB in separate initial DL BWP (DL BWP #0A) and CORESET #0A may follow the same multiplexing pattern as used between the CD-SSB and CORESET #0. Alternatively, a RedCap UE is provided with the multiplexing pattern between the SSB in separate initial DL BWP and CORESET #0A via SIB1 signaling, and the used pattern may be independent of the SSB-CORESET #0 multiplexing pattern.

In some embodiments, a RedCap UE, when configured with enhanced paging reception and Paging Early Indication (PEI) for paging monitoring, may expect to be provided with a configuration of PEI and configuration of Synchronization Signal Block (SSB) in a separate initial DL BWP (DL BWP #0A) that is configured via SIB signaling with Type 1 PDCCH CSS for random access related DL reception for RedCap UEs if the DL BWP #0A is also configured with Type 2 PDCCH CSS for paging reception, where the SSB periodicity and indexing are identical to the Cell Defining SSB (CD-SSB) for the camping or serving cell but located with non-zero offsets from the NR synchronization raster in the frequency domain.

In some embodiments, a RedCap UE, provided with SSB configuration in the separate initial DL BWP (DL BWP #0A), may be provided with the frequency location of the SSB via SIB1 signaling. In an example of the embodiment, the UE may be provided with the starting (lowest) PRB index for the SSB, where the PRB index may be based on one of (1) the Common Resource Block (CRB) grid, or (2) defined within the set of PRBs indexed within the DL BWP #0A (i.e., an indication of the frequency offset in number of PRBs from the lowest PRB of the DL BWP #0A), or (3) indication of the frequency offset in number of PRBs from the lowest PRB of the CORESET #0A.

In some embodiments, the UE may be optionally provided via SIB1 signaling an offset (kSSB-DLBWP0A) in units of subcarriers at 15 kHz Sub-Carrier Spacing (SCS) with a range of 0 to 23 for FR1 or an offset in units of subcarriers at the SCS for initial DL BWP defined by CORESET #0 (DL BWP #0) with a range of 0 to 11 for FR2 respectively, where the offset is defined with respect to the PRB grid. Alternatively, or if not provided, the UE may assume the value of the subcarrier-level offset as zero for non-CD-SSB transmitted in separate initial DL BWP (DL BWP #0A).

In some embodiments, a RedCap UE, provided with SSB configuration in the separate initial DL BWP (DL BWP #0A), may assume that SSBs with the same SSB index are Quasi-Co-Located (QCL-ed). In other words, the UE may assume that the antenna ports used for transmissions of SS/PBCH blocks with the same index recurring with the SS/PBCH burst set periodicity are quasi-collocated with respect to spatial, average gain, delay, and Doppler parameters. By default, a UE may not assume that antenna ports used for transmissions of SSBs with different indices are quasi-co-located with respect to spatial, average gain, delay, and Doppler parameters.

In some aspects, a RedCap UE, provided with separate initial DL BWP (DL BWP #0A), may assume that the DMRS of the PDCCH in CORESET #0A and the DMRS of the PDSCH for the reception of one or more of Types 0/0A/1/2 PDCCH CSS sets or associated PDSCH are Quasi-Co-Located (QCL-ed) with the corresponding CD-SSB, where the mapping to the CD-SSB index is same as that for CORESET #0 or defined explicitly via SIB1 signaling.

In some embodiments, a RedCap UE, provided with separate initial DL BWP (DL BWP #0A), may assume that the DMRS of the PDCCH in CORESET #0A and the DMRS of the PDSCH for the reception of one or more of Types 0/0A/1/2 PDCCH CSS sets or associated PDSCH are Quasi-Co-Located (QCL-ed) with the corresponding non-CD-SSB if a non-CD-SSB is configured in the separate initial DL BWP (DL BWP #0A), where the mapping to the CD-SSB index is same as that for CORESET #0 or defined explicitly via SIB1 signaling.

PEI and TRS/CSI-RS in RRC_IDLE/RRC_INACTIVE Modes for RedCap UEs Provided with CORESET #0A/DL BWP #0A In some aspects, a UE configured with CORESET 0A/DL BWP 0A may be further configured with a paging early indication (PEI) feature where the PEI indicates the UE whether to monitor one or more subsequent POs for paging message reception. In one embodiment, a UE may only monitor PEI in a default DL BWP, which can be either BWP 0 or 0A. Alternatively, a UE can monitor the PEI in the DL BWP that is active at the monitoring occasions. In another embodiment, a UE may be configured to monitor for PEI in the same CORESET or DL BWP in which it is configured to monitor for Type-2 PDCCH CSS for paging reception.

In some embodiments, a UE may monitor PEI in a first DL BWP and if a PEI indicates the UE to monitor PO, the UE may receive the paging message (paging DCI and/or paging PDSCH) in a second DL BWP that may be different from the first DL BWP. In one example of the embodiment, a UE may be configured by higher layer signaling such as SIBx, x=1, 2, . . . , to identify the first and second DL BWP. In another example of the embodiment, PEI may indicate the DL BWP index where UE expects to receive the paging message, which can be the same or different than the DL BWP where PEI was received. In the above example, PEI can be a sequence-based transmission or a PDCCH-based transmission. In one embodiment, if PEI and PO are monitored in different BWPs, UE may expect to observe a minimum time gap between the last valid PEI monitoring occasion and the start of PO. In one example, the minimum time gap can be expressed in slots (e.g., based on the numerology of the active DL BWP or a reference DL BWP) or in ms.

In some embodiments, a UE can be configured by SIBx signaling with TRS/CSI-RS occasions in idle/inactive mode, which can be used for time/frequency tracking, AGC, and/or cell measurements. In an embodiment, TRS/CSI-RS occasions may be configured in the DL BWP in which the UE is configured to monitor for paging reception. In another embodiment, TRS/CSI-RS occasions may be configured in the DL BWP #0 defined by CORESET #0.

In some embodiments, TRS/CSI-RS occasions can be monitored in any active DL BWP, which can be either BWP 0 or BWP 0A, and is not expected to receive TRS/CSI-RS outside the active DL BWP. This implies BW of TRS/CSI-RS at the configured occasions may not be restricted by the initial DL BWP or active DL BWP, which can be either BWP 0 or 0A. Alternatively, a UE may only monitor TRS/CSI-RS in a default BWP which can be either BWP 0 or BWP 0A. In some aspects, a UE may be provided with a parameter as part of BWP 0 or BWP 0A configuration on whether to monitor TRS/CSI-RS occasions when the corresponding BWP is active.

In some embodiments, a UE may be provided with an availability indication for the TRS/CSI-RS occasions, where the availability indication notifies the UE whether TRS/CSI-RS in the configured occasions will be transmitted or not. In one embodiment, availability indication can be specific to a DL BWP, e.g., BWP 0 or BWP 0A. Alternatively, availability indication may apply to any configured DL BWP in general and UE would monitor for TRS/CSI-RS occasions in any active DL BWP once they are indicated available.

In some embodiments, the numerology of TRS/CSI-RS transmission can be assumed the same as the active DL BWP, which can be BWP 0 or BWP0A or can be based on reference numerology. For example, reference numerology can be indicated as part of the TRS/CSI-RS configuration. Reference numerology can be the same or different than the numerology of BWO 0 or 0A. Alternatively, numerology of TRS/CSI-RS can be assumed the same as initial BWP 0 or same as SSB, regardless of numerology of active DL BWP. In one example, if the UE identifies that TRS/CSI-RS numerology is different from the numerology of the active DL BWP, UE may choose to not monitor the TRS/CSI-RS occasions overlapping with the active DL BWP. Alternatively, a UE may switch to the numerology of the TRS/CSI-RS and monitor them before switching back to the numerology of the active DL BWP, i.e., the UE may observe a gap.

In some embodiments, separate TRS/CSI-RS configurations can be provided for each DL BWP, 0 and 0A. In one example, BWP ID can be included in the TRS/CSI-RS configuration or TRS/CSI-RS configuration can be included as part of the BWP configuration.

Initial UL BWP for RedCap UEs

In some embodiments, the initial UL BWP (referred to UL BWP #0) is provided to the UE via SIB1 message. Separate configuration of UL BWP #0 between RedCap and non-RedCap UEs can be beneficial if, e.g., the UL BWP #0 for non-RedCap UEs may be larger than the max RedCap UE BW in the UL, viz., 20 MHz in FR1 and 100 MHz in FR2 respectively.

In some embodiments, for TDD deployments, the initial DL BWP (DL BWP #0/#0A) and UL BWP #0 for RedCap UEs may not share a common center frequency. In such a case, frequency retuning gaps may be defined in addition to Rx-to-Tx and Tx-to-Rx switching times during DL-to-UL transitions and UL-to-DL transitions respectively.

In some embodiments, for RedCap UEs, the UL BWP #0 may be separately provided from that for non-RedCap UEs. Such configuration could be explicit, e.g., via SIB1 message, or implicit, e.g., determined based on the configuration of UL BWP #0 for non-RedCap UEs (following Rel-15 specifications) and one or more of: configured RACH Occasions (ROs), or indicated FDRA for Msg3 PUSCH as indicated in the UL grant in Random Access Response (RAR).

In some aspects, the option of using ROs to determine initial UL BWP for RedCap UEs may be realized using combinations of the options described below:

(a) A reference configuration for initial UL BWP is provided to the UE that provides all parameters that may be provided via initial UL BWP configuration (using initialUplinkBWP), except for the actual frequency domain resources for the BWP. In an example, the reference configuration for the initial UL BWP for RedCap UE may be the same as that provided in SIB1 for non-RedCap UEs. Further, in an example, the BW of the initial UL BWP may be provided separately to RedCap UEs, e.g., in the number of PRBs assuming the same SCS indicated as in the reference configuration for the initial UL BWP. In another example, the BW of the initial UL BWP for RedCap UEs may be determined as a minimum of (i) the BW of the initial UL BWP configured in SIB1 for non-RedCap UEs (via initialUplinkBWP), and (ii) the max UE BW for the RedCap UE in the corresponding Frequency Range (FR).

(b) Instead of the explicit configuration of startPRB and numPRBs, the UE may be provided with a reference frequency location.

(b.1) In one example, the reference frequency location is the starting PRB of the UL BWP #0 configured in SIB1 for non-RedCap UEs.

(b.2) In another example, the reference frequency location is the starting PRB of a RO provided as part of the initial UL BWP configuration in SIB1 for non-RedCap UEs, via RACH-ConfigCommon in BWP-UplinkCommon. In a further example, if multiple ROs are provided with different frequency locations, the RO used to define the starting PRB of the initial UL BWP is determined based on the RO that is selected for Msg1 transmission from the RedCap UE.

(b.3) In some aspects, the RACH configuration is separately provided to RedCap and non-RedCap UEs. Specifically, a separate UL BWP #0 configuration may be provided to RedCap UEs via SIB1 to provide a "reference UL BWP #0" location. The separate UL BWP #0 configuration may include the RACH configuration and the UE may determine the actual UL BWP #0 based on the RO location as described above.

(b.4) In yet another example, the reference frequency location is the starting PRB of the Msg3 PUSCH scheduled by the UL grant in RAR. In this case, in an example, the RedCap UE may transmit Msg1 using a RO that may be configured via RACH-ConfigCommon in BWP-UplinkCommon. Alternatively, one or more ROs may be separately configured for RedCap UEs with frequency resources for the ROs indicated with respect to the Common Resource Block (CRB) grid provided for the UL carrier. Further, in an example, the FDRA for Msg3 PUSCH may be defined concerning either the CRB grid or concerning PRB #0 of the initial UL BWP configured for non-RedCap UEs (via initialUplinkBWP).

In some embodiments, once the initial UL BWP is determined by RedCap UEs, the subsequent UL transmissions, that may include one or more of Msg1 transmission, Msg3 transmission, Msg3 retransmission, and PUCCH transmission with HARQ-ACK feedback in response to Msg4 PDSCH (depending on the stage during initial access the initial UL BWP is determined by RedCap UEs), MsgA PRACH and PUSCH, PUCCH transmission with HARQ-ACK feedback in response to MsgB PDSCH for 2-step RACH are transmitted in the initial UL BWP for RedCap UEs.

In some embodiments, in idle/inactive modes, a RedCap UE may expect that the initial DL BWP configured to the UE at least for Random Access-related monitoring, i.e., at least includes Type 1 PDCCH CSS configuration, and the initial UL BWP (that can be separately configured for RedCap UEs) in which PRACH resources are configured for RedCap UE share the same center frequency. Here, the initial DL BWP can either be the MIB-indicated CORESET #0 or a separate initial DL BWP provided to the UE via SIB1. In other words, a RedCap UE may expect that, in RRC idle or inactive modes, UL BWP #0 configured for RedCap UEs shares the same center frequency as the initial DL BWP in which the RedCap UE is expected to monitor for Type 2 PDCCH CSS candidates for monitoring as part of the random access procedure.

In some embodiments, a RedCap UE may expect that, in RRC idle or inactive modes, UL BWP #0 configured for RedCap UEs shares the same center frequency as the initial DL BWP in which the RedCap UE is expected to monitor for Type 1 PDCCH CSS candidates for monitoring as part of the random access procedure.

In some embodiments, if a RedCap UE is configured with Small Data Transmissions (SDT) over 4-step or 2-step RACH (RA-SDT) feature that allows UL transmissions when in RRC Inactive state, the initial UL BWP that is configured with RACH Occasions (ROs) for RedCap UEs may be used for triggering of SDT, either based on 4-step or 2-step RACH.

In some embodiments, a RedCap UE, configured with RA-SDT feature, may expect that, in RRC inactive mode, initial UL BWP configured to the RedCap UE with ROs for Message 1 or Message A transmissions shares the same center frequency as the initial DL BWP in which the RedCap UE is expected to monitor for Type 1 PDCCH CSS candidates for monitoring as part of the random access procedure.

In another embodiment, if a RedCap UE is configured with Small Data Transmissions (SDT) over Configured Grant PUSCH (CG-SDT) feature that allows UL transmissions when in RRC Inactive state, the initial UL BWP that is configured with RACH Occasions (ROs) for RedCap UEs can be configured with CG PUSCH Occasions for RedCap UEs to trigger CG-SDT. Alternatively, if a RedCap UE is configured with Small Data Transmissions (SDT) over Configured Grant PUSCH (CG-SDT) feature that allows UL transmissions when in RRC Inactive state, an UL BWP that is different from the initial UL BWP that is configured with RACH Occasions (ROs) for RedCap UEs can be configured with CG PUSCH Occasions for RedCap UEs to trigger CG-SDT.

In some embodiments, a RedCap UE, configured with CG-SDT feature, may expect that, in RRC inactive mode, initial UL BWP configured to the RedCap UE with CG PUSCH occasions to trigger CG-SDT shares the same center frequency as the DL BWP in which the RedCap UE is expected to monitor for PDCCH Search Space (SS) set candidates for monitoring for PDCCH from the gNB in response to a CG-SDT transmission. In an example of this embodiment, the DL BWP in which the RedCap UE is expected to monitor for PDCCH Search Space (SS) set candidates for monitoring for PDCCH from the gNB in response to a CG-SDT transmission is the same as the initial DL BWP that the RedCap UE is expected to use for monitoring of Type 1 PDCCH CSS candidates for Random Access (RA) procedure.

In some aspects, the above embodiments and examples on SDT can be extended for the case of SDT from RRC Idle mode, if the latter feature is supported.

SIB-Configured DL BWP

In some aspects, a UE may be provided with a configuration for initial DL BWP via SIB1 that then replaces the initial DL BWP defined by CORESET #0 once the UE is in RRC_CONNECTED mode, that is, for RRC_IDLE and RRC_INACTIVE modes, DL BWP #0 defined by CORESET #0 is used for DL receptions.

In some embodiments, with the introduction of RedCap UEs, the configuration of initial DL BWP provided via SIB1, may apply separately for non-RedCap and RedCap UEs. In an embodiment, the configuration of initial DL BWP as indicated via SIB1 (in initialDownlinkBWP) may not be used by RedCap UEs. In some aspects, the indication only applies to non-RedCap UEs. In an example of the embodiment, RedCap UEs once in RRC_CONNECTED mode may assume one or more of the following to define the initial DL BWP: (i) initial DL BWP defined by CORESET #0; (ii) initial DL BWP defined by CORESET #0A, if supported and provided to the UE, at least for one or more of paging and random access-related PDL receptions; and (iii) initial DL BWP configuration for RedCap UEs that may be optionally provided to the UE via SIB signaling that is separate from initial DL BWP indication for non-RedCap UEs via initialDownlinkBWP.

In another example of the embodiment, RedCap UEs once in RRC_CONNECTED mode may assume one or more of the following to define the initial DL BWP: (i) initial DL BWP defined by CORESET #0; (ii) initial DL BWP defined by CORESET #0A, if supported and provided to the UE, at least for one or more of paging and random access-related PDL receptions; (iii) initial DL BWP configuration for RedCap UEs that may be optionally provided to the UE via SIB signaling that is separate from initial DL BWP indication for non-RedCap UEs via initialDownlinkBWP; and (iv) initial DL BWP configuration indicated for non-RedCap UEs. In a further example, the initial DL BWP configuration indicated for non-RedCap UEs is used by RedCap UE if the corresponding BW does not exceed max RedCap UE BW. Thus, an example of the overall mechanism to determine the initial DL BWP in RRC_CONNECTED mode could be summarized as follows:

In some aspects, initial DL BWP for RedCap UEs in connected mode is given by: (a) initial DL BWP configured for RedCap UEs (separate from that indicated via initialDownlinkBWP), if provided; else, (b) initial DL BWP configured for non-RedCap UEs (indicated via initialDownlinkBWP), if the BW does not exceed max RedCap UE BW; else, (c) initial DL BWP defined by CORESET #0A, if provided and indicated; else, (d) initial DL BWP defined by CORESET #0.

In some embodiments, instead of providing a separate initialDownlinkBWP configuration, the BWP-Downlink-Common structure provided via DownlinkConfigCommon-SIB that is used for initialDownlinkBWP may be extended with a new optional parameter locationAndBandwidth-r17 that RedCap UEs may be configured to use, to replace the location AndBandwidth parameter associated with the initialDownlinkBWP configuration, while other parameters are used as provided via initialDownlinkBWP.

In some embodiments, if a separate DL BWP #0 is provided to a RedCap UE via separate configuration of initialDownlinkBWP or separate configuration of locationAndBandwidth parameter or a UE-specifically configured DL BWP with index greater than 0, the UE expects the separately indicated DL BWP #0 or DL BWP with index greater than 0, to also include the SSB and CORESET #0 for the serving cell, at least when the span in frequency covering the DL BWP #0 and the SSB and/or CORESET #0 may exceed the maximum RedCap UE BW. In a further example, the constraint of the separate DL BWP #0 to include the SSB and CORESET #0 of the serving cell is only limited to FR1 bands.

In some embodiments, upon RRC connection, if SSB and/or CORESET #0 are not included within an active DL BWP of a RedCap UE and the span in frequency covering the active DL BWP and the SSB and/or CORESET #0 may exceed the maximum RedCap UE BW, then for a set of symbols of a slot indicated to the UE by ssbPositionsInBurst in SIB1 or ssb-PositionsInBurst in ServingCellConfigCommon, for the reception of SS/PBCH blocks, and a set of symbols wherein the UE is expected to receive PDCCH in CORESET #0, e.g., for PDCCH with CRC scrambled with SI-RNTI, P-RNTI, RA-RNTI, and any associated PDSCH, the UE may be expected to retune to the frequency region defined by CORESET #0 for DL reception. That is, CORESET #0 may define the active DL BWP in the set of symbols while other parameters (e.g., at least pdcch-ConfigCommon, pdsch-ConfigCommon) provided via DL BWP configuration may be reused from that for the active DL BWP, if not provided separately. Alternatively, a UE may be provided with a DL BWP configuration, e.g., DL BWP #0 or another UE-specifically configured DL BWP, that always includes the CORESET #0 and SSB if UE is configured with a DL BWP that may not include one or more of SSB and CORESET #0. For unpaired spectrum, a UL BWP may also be defined corresponding to this DL BWP with SSB and CORESET #0 to share the same center frequency. If there may be multiple DL BWP configurations and at least one DL BWP configuration that does not include CORESET #0, the DL BWP configuration that includes SSB and CORESET #0 and has the smallest BWP index is selected.

In some embodiments, where DL BWP configuration is partly reused from active DL BWP configuration, all parameters except for PDCCH monitoring or PDSCH reception that may map to resources outside of the frequency region defined by CORESET #0 or CORESET #0 and the SSB may be reused from the active DL BWP configuration. Thus, a UE may be expected to receive PDCCH with CRC scrambled with one of C-RNTI, CS-RNTI, MCS-C-RNTI, or any of Type 3 PDCCH CSS search space sets if configured and mapped to CORESET #0. Further, a UE may not be expected to be dynamically scheduled with DL channels or signals outside of the frequency region defined by CORESET #0.

In some embodiments, frequency retuning gaps may be defined before and after the set of symbols of the slot wherein, the UE is expected to receive SSB or receive in the DL in CORESET #0 when the SSB or CORESET #0 (respectively) may not be included in the active DL BWP. In an example, the frequency retuning gaps only account for frequency retuning and are shorter than BWP switching times specified per Rel-15 NR specifications.

In some embodiments, for the reception of PDCCH in CORESET #0 and any associated PDSCH, the set of symbols may include the symbols corresponding to the PDCCH monitoring occasions (MOs) as well as a maximum number of slots and symbols corresponding to the sum of a maximum value of K0 slot offset between PDCCH and PDSCH for the DCI formats monitored in CORESET #0 as defined by the applicable PDSCH time domain resource allocation (TDRA) table and the maximum duration of a scheduled PDSCH (e.g., 14 (or 12) symbols for normal (or extended) cyclic prefix). In another example, the set of symbols may be defined in numbers of slots starting from the first slot with a corresponding SSB occasion or PDCCH MO for monitoring in CORESET #0.

In some aspects, for unpaired spectrum, a UE may continue to operate in the active UL BWP while there may be a BWP switch between active DL BWP to CORESET #0, and accordingly, frequency retuning gaps may be defined between DL reception and UL transmission, and vice-versa. Alternatively, for unpaired spectrum, a UE may also switch its active UL BWP to the frequency region defined by CORESET #0 in the DL, which may or may not coincide with UL BWP #0 configuration provided via SIB1 for the UE.

Example aspects of the disclosed techniques may include one or more of the following functionalities. A system and method of wireless communication for a fifth-generation (5G) or new radio (NR) system includes support of a reduced capability (RedCap) NR UE. For the RedCap UE, one or more of the following may be configured: (a) an additional CORESET (e.g., CORESET #0A), that defines a DL BWP (DL BWP #0A) in addition to DL BWP #0, for the reception of PDCCH and/or PDSCH related at least one of paging and random access procedure; and (b) initial UL BWP configuration that is separate from the initial UL BWP configuration for non-RedCap UEs.

In some embodiments, for unpaired spectrum (TDD deployments), a UE is configured with DL BWP #0A that may have a center frequency different from the center frequency of UL BWP #0.

In some embodiments, frequency retuning gaps are specified between the last DL symbol in which the UE may receive DL physical channels or signals and a first UL symbol used for transmission from the UE and vice-versa, in addition to the Rx-to-Tx and Tx-to-Rx switching times respectively that are currently specified [3GPP TS 38.211], and where the frequency retuning gap is defined in numbers of OFDM Symbols (OSs) or in units of time.

In some embodiments, when provided with a CORESET #0A for one or more of paging- and random access-related DL receptions, the size of CORESET #0A in the frequency domain is the same as that for CORESET #0.

In some embodiments, when provided with a CORESET #0A for one or more of paging- and random access-related DL receptions, the sizes of CORESET #0 and CORESET

#0A may be different, and the size of DCI format monitored in a CSS is determined according to CORESET #0.

In some embodiments, when provided with a CORESET #0A for one or more of paging- and random access-related DL receptions, for a CORESET with index 0A, the UE may assume that a DM-RS antenna port for PDCCH receptions in the CORESET is quasi co-located with the one or more DL RS configured by a TCI state, where the TCI state is indicated by a MAC CE activation command for the CORESET, if any, or a SS/PBCH block the UE identified during a most recent random access procedure not initiated by a PDCCH order that triggers a contention-free random access procedure if no MAC CE activation command indicating a TCI state for the CORESET is received after the most recent random access procedure.

In some embodiments, when configured with paging early indication (PEI) feature where the PEI indicates the UE whether to monitor one or more subsequent POs for paging message reception, the UE may only monitor PEI in a default DL BWP, which can be either BWP 0 or 0A.

In some embodiments, when configured with paging early indication (PEI) feature where the PEI indicates the UE whether to monitor one or more subsequent POs for paging message reception, the UE may only monitor PEI in the CORESET or DL BWP in which the UE monitors for paging reception (i.e., configured with Type 2 PDCCH CSS).

In some embodiments, when configured with paging early indication (PEI) feature where the PEI indicates the UE whether to monitor one or more subsequent POs for paging message reception, the UE monitors PEI in a first DL BWP and if PEI indicates the UE to monitor PO, UE receives the paging message (paging DCI and/or paging PDSCH) in a second DL BWP that may be different from the first DL BWP.

In some embodiments, when configured with TRS or CSI-RS occasions for use in RRC_INACTIVE or RRC_IDLE modes, the TRS/CSI-RS occasions are configured in the DL BWP in which the UE is configured to monitor for paging reception (i.e., configured with Type 2 PDCCH CSS).

In some embodiments, when configured with TRS or CSI-RS occasions for use in RRC_INACTIVE or RRC_IDLE modes, the TRS/CSI-RS occasions are configured in the DL BWP #0 defined by CORESET #0.

In some embodiments, when configured with TRS or CSI-RS occasions for use in RRC_INACTIVE or RRC_IDLE modes, the TRS/CSI-RS occasions are separately configured in the DL BWP #0 defined by CORESET #0 and also in DL BWP #0A.

In some embodiments, for unpaired spectrum (TDD deployments), when configured with an initial UL BWP (UL BWP #0) via SIB1, the initial DL BWP (DL BWP #0 or DL #0A, if provided) and UL BWP #0 for RedCap UEs may not share a common center frequency.

In some aspects, the configuration of initial DL BWP as indicated via SIB1 (in initialDownlinkBWP) may not be used by RedCap UEs.

In some embodiments, for RedCap UEs, when in RRC_CONNECTED mode, one or more of the following may be used to define the initial DL BWP: (i) initial DL BWP defined by CORESET #0; (ii) initial DL BWP defined by CORESET #0A, if provided, at least for one or more of paging and random access-related PDL receptions; and (iii) initial DL BWP configuration for RedCap UEs that may be optionally provided to the UE via SIB signaling that is separate from initial DL BWP indication for non-RedCap UEs via initialDownlinkBWP.

In some embodiments, for a RedCap UE, when in RRC_CONNECTED mode, one or more of the following is assumed to define the initial DL BWP: (i) initial DL BWP defined by CORESET #0; (ii) initial DL BWP defined by CORESET #0A, if provided, at least for one or more of paging and random access-related PDL receptions; and (iii) initial DL BWP configuration for RedCap UEs that may be optionally provided to the UE via SIB signaling that is separate from initial DL BWP indication for non-RedCap UEs via initialDownlinkBWP.

In some embodiments, for the RedCap UE, when in RRC_CONNECTED mode, one or more of the following is assumed to define the initial DL BWP: (i) initial DL BWP defined by CORESET #0; (ii) initial DL BWP defined by CORESET #0A, if provided, at least for one or more of paging and random access-related PDL receptions; (iii) initial DL BWP configuration for RedCap UEs that may be optionally provided to the UE via SIB signaling that is separate from initial DL BWP indication for non-RedCap UEs via initialDownlinkBWP, and (iv) initial DL BWP configuration indicated for non-RedCap UEs.

In some embodiments, the Initial DL BWP for the RedCap UE in connected mode is given by: initial DL BWP configured for RedCap UEs (separate from that indicated via initialDownlinkBWP), if provided; else, initial DL BWP configured for non-RedCap UEs (indicated via initialDownlinkBWP), if the BW does not exceed max RedCap UE BW; else, initial DL BWP defined by CORESET #0A, if provided and indicated; else, initial DL BWP defined by CORESET #0.

In some aspects, the BWP-DownlinkCommon structure provided via DownlinkConfigCommonSIB that is used for initialDownlinkBWP is extended with an optional parameter locationAndBandwidth-r17 that the RedCap UE is configured to use, to replace the locationAndBandwidth parameter associated with the initialDownlinkBWP configuration, while other parameters are used as provided via initialDownlinkBWP.

In some embodiments, if a separate DL BWP #0 is provided to a RedCap UE via separate configuration of initialDownlinkBWP or separate configuration of locationAndBandwidth parameter or a UE-specifically configured DL BWP with index greater than 0, the UE expects the separately indicated DL BWP #0 or DL BWP with index greater than 0, to also include the SSB and CORESET #0 for the serving cell, at least when the span in frequency covering the DL BWP #0 and the SSB and/or CORESET #0 may exceed the maximum RedCap UE BW.

In some embodiments, upon RRC connection, if SSB and/or CORESET #0 are not included within an active DL BWP of a RedCap UE and the span in frequency covering the active DL BWP and the SSB and/or CORESET #0 may exceed the maximum RedCap UE BW, then for a set of symbols including symbols of a slot indicated to the UE by ssbPositionsInBurst in SIB1 or ssb-PositionsInBurst in ServingCellConfigCommon, for the reception of SS/PBCH blocks, and a set of symbols including symbols wherein the UE is expected to receive PDCCH in CORESET #0, e.g., for PDCCH with CRC scrambled with SI-RNTI, P-RNTI, RA-RNTI, and any associated PDSCH, the UE is expected to retune to the frequency region defined by CORESET #0 for DL reception.

In some embodiments, the UE is provided with a DL BWP configuration that always includes the CORESET #0 and SSB if UE is configured with a DL BWP that may not include one or more of SSB and CORESET #0.

In some embodiments, the DL BWP configuration is DL BWP #0 or another UE-specifically configured DL BWP.

In some embodiments, in case of multiple DL BWP configurations and at least one DL BWP configuration that does not include SSB or CORESET #0, the DL BWP configuration that includes SSB and CORESET #0 and has the smallest BWP index is selected.

In some embodiments, the span in the frequency domain for CORESET #0A is the same as that for the separate initial DL BWP (DL BWP #0A).

In some embodiments, the span in the frequency domain for CORESET #0A may be smaller than (that is, a proper subset of) the span in the frequency domain for DL BWP #0A.

In some aspects, the UE may expect configuration of Synchronization Signal Block (SSB) in a separate initial DL BWP (DL BWP #0A) that is configured via SIB signaling with Type 1 PDCCH CSS for random access related DL reception for RedCap UEs if the DL BWP #0A is also configured with Type 2 PDCCH CSS for paging reception, where the SSB periodicity and indexing are identical to the Cell Defining SSB (CD-SSB) for the camping or serving cell but located with non-zero offsets from the NR frequency raster in the frequency domain.

In some embodiments, the UE may expect configuration of Synchronization Signal Block (SSB) and configurations for Types 0 and 0A for Remaining Minimum System Information (RMSI) and Other System Information (OSI) respectively in a separate initial DL BWP (DL BWP #0A) that is configured via SIB signaling with Type 1 PDCCH CSS for random access related DL reception for RedCap UEs if the DL BWP #0A is also configured with Type 2 PDCCH CSS for paging reception, where the SSB periodicity and indexing are identical to the Cell Defining SSB (CD-SSB) for the camping or serving cell but located with non-zero offsets from the NR synchronization raster in the frequency domain.

In some aspects, the UE may be provided with configurations of Types 0 or 0A PDCCH CSS with monitoring occasions (MOs) that are the same as that defined for CORESET #0.

In some aspects, the UE is provided with a configuration of the PDCCH Monitoring Occasions (MOs) for Types 0/0A PDCCH CSS sets in CORESET #0A in separate initial DL BWP that is separately provided from the monitoring occasions for Type 0/0A PDCCH CSS sets in CORESET #0.

In some embodiments, the signaling of the configuration for Type 0 PDCCH CSS is provided to the UE using 4 bits as used via Master Information Block (MIB) signaling for CORESET #0 defined by MIB.

In some embodiments, a UE may assume the same System Information (SI) monitoring window configuration, which includes time offset, duration, and periodicity, as that for CORESET #0.

In some embodiments, the multiplexing between the SSB in separate initial DL BWP (DL BWP #0A) and CORESET #0A follows the same multiplexing pattern as used between the Cell Defining-SSB (CD-SSB) and CORESET #0.

In some aspects, the UE is provided with the multiplexing pattern between the SSB in separate initial DL BWP and CORESET #0A via SIB1 signaling.

In some embodiments, the UE, when configured with enhanced paging reception and Paging Early Indication (PEI) for paging monitoring, may expect to be provided with the configuration of PEI and configuration of Synchronization Signal Block (SSB) in a separate initial DL BWP (DL BWP #0A) that is configured via SIB signaling with Type 1 PDCCH CSS for random access related DL reception for RedCap UEs if the DL BWP #0A is also configured with Type 2 PDCCH CSS for paging reception, where the SSB periodicity and indexing are identical to the Cell Defining SSB (CD-SSB) for the camping or serving cell but located with non-zero offsets from the NR synchronization raster in the frequency domain.

In some aspects, the UE, provided with SSB configuration in the separate initial DL BWP (DL BWP #0A), may be provided with the frequency location of the SSB via SIB1 signaling.

In some embodiments, the UE is provided with the starting (lowest) PRB index for the SSB, where the PRB index is based on one of (1) the Common Resource Block (CRB) grid, or (2) defined within the set of PRBs indexed within the DL BWP #0A (i.e., an indication of the frequency offset in number of PRBs from the lowest PRB of the DL BWP #0A), or (3) indication of the frequency offset in number of PRBs from the lowest PRB of the CORESET #0A.

In some aspects, the UE may be optionally provided via SIB1 signaling an offset (kSSB-DLBWP0A) in units of subcarriers at 15 kHz Sub-Carrier Spacing (SCS) with a range of 0 to 23 for FR1 or an offset in units of subcarriers at the SCS for initial DL BWP defined by CORESET #0 (DL BWP #0) with a range of 0 to 11 for FR2 respectively, where the offset is defined with respect to the PRB grid, and if not provided, the UE may assume the value of the subcarrier-level offset as zero for non-CD-SSB transmitted in separate initial DL BWP (DL BWP #0A).

In some embodiments, the UE, provided with SSB configuration in the separate initial DL BWP (DL BWP #0A), may assume that SSBs with the same SSB index are Quasi-Co-Located (QCL-ed), that is, the UE may assume that the antenna ports used for transmissions of SS/PBCH blocks with the same index recurring with the SS/PBCH burst set periodicity are quasi-collocated with respect to spatial, average gain, delay, and Doppler parameters. By default, a UE may not assume that antenna ports used for transmissions of SSBs with different indices are quasi-co-located with respect to spatial, average gain, delay, and Doppler parameters.

In some embodiments, the UE that is not capable of supporting operations in an active DL BWP without SSB, when in RRC_CONNECTED state, may expect either of the following to be configured within the active DL BWP: (1) the CD-SSB, or (2) the SSB configured within the separate initial DL BWP (DL BWP #0A), or (3) a separate configuration of non-cell defining-SSB.

In some embodiments, the UE, provided with separate initial DL BWP (DL BWP #0A), may assume that the DMRS of the PDCCH in CORESET #0A and the DMRS of the PDSCH for the reception of one or more of Types 0/0A/1/2 PDCCH CSS sets or associated PDSCH are Quasi-Co-Located (QCL-ed) with the corresponding CD-SSB, where the mapping to the CD-SSB index is same as that for CORESET #0 or defined explicitly via SIB1 signaling.

In some aspects, the UE, provided with separate initial DL BWP (DL BWP #0A), may assume that the DMRS of the PDCCH in CORESET #0A and the DMRS of the PDSCH for the reception of one or more of Types 0/0A/1/2 PDCCH CSS sets or associated PDSCH are Quasi-Co-Located (QCL-ed) with the corresponding non-CD-SSB if a non-CD-SSB is configured in the separate initial DL BWP (DL BWP #0A), where the mapping to the CD-SSB index is same as that for CORESET #0 or defined explicitly via SIB1 signaling.

In some embodiments, in idle/inactive modes, the UE may expect that UL BWP #0 configured for RedCap UEs shares the same center frequency as the initial DL BWP in which the RedCap UE is expected to monitor for Type 2 PDCCH CSS candidates for monitoring as part of the random access procedure.

In some embodiments, in idle/inactive modes, the UE may expect that UL BWP #0 configured for RedCap UEs shares the same center frequency as the initial DL BWP in which the RedCap UE is expected to monitor for Type 1 PDCCH CSS candidates for monitoring as part of the random access procedure.

In some aspects, when configured with Small Data Transmissions (SDT) over 4-step or 2-step RACH (RA-SDT) feature, the initial UL BWP that is configured with RACH Occasions (ROs) for RedCap UEs can be used for triggering of SDT, either based on 4-step or 2-step RACH.

In some aspects, when configured with RA-SDT feature, may expect that, in RRC inactive mode, initial UL BWP configured to the RedCap UE with ROs for Message 1 or Message A transmissions shares the same center frequency as the initial DL BWP in which the RedCap UE is expected to monitor for Type 1 PDCCH CSS candidates for monitoring as part of the random access procedure.

In some embodiments, when configured with Small Data Transmissions (SDT) over Configured Grant PUSCH (CG-SDT) feature that allows UL transmissions when in RRC Inactive state, the initial UL BWP that is configured with RACH Occasions (ROs) for RedCap UEs can be configured with CG PUSCH Occasions for RedCap UEs to trigger CG-SDT.

In some embodiments, when configured with CG-SDT feature, may expect that, in RRC inactive mode, initial UL BWP configured to the RedCap UE with CG PUSCH occasions to trigger CG-SDT shares the same center frequency as the DL BWP in which the RedCap UE is expected to monitor for PDCCH Search Space (SS) set candidates for monitoring for PDCCH from the gNB in response to a CG-SDT transmission.

In some aspects, when configured with CG-SDT feature, may expect that, in RRC inactive mode, the DL BWP in which the UE is expected to monitor for PDCCH Search Space (SS) set candidates for monitoring for PDCCH from the gNB in response to a CG-SDT transmission is same as the initial DL BWP that the UE is expected to use for monitoring of Type 1 PDCCH CSS candidates for Random Access (RA) procedure.

Figure 7:
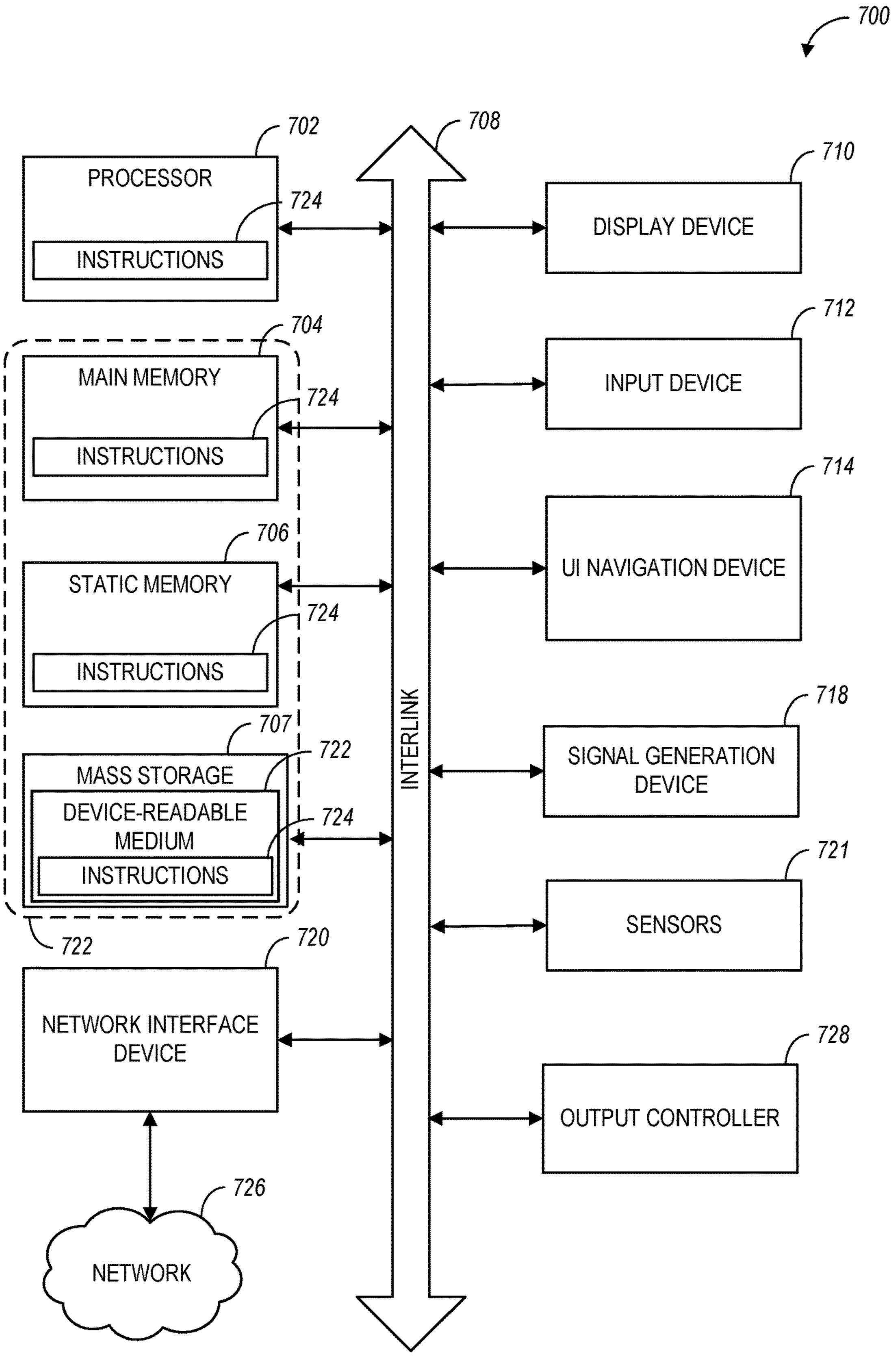
FIG. 7 illustrates a block diagram of a communication device such as an evolved Node-B (eNB), a new generation Node-B (gNB) (or another RAN node or a base station), a transmission-reception point (TRP), an access point (AP), a wireless station (STA), a mobile station (MS), or a user equipment (UE), in accordance with some aspects.

FIG. 7 illustrates a block diagram of a communication device such as an evolved Node-B (eNB), a new generation Node-B (gNB) (or another RAN node or a base station), a transmission-reception point (TRP), an access point (AP), a wireless station (STA), a mobile station (MS), or a user equipment (UE), in accordance with some aspects. In alternative aspects, the communication device 700 may operate as a standalone device or may be connected (e.g., networked) to other communication devices.

Circuitry (e.g., processing circuitry) is a collection of circuits implemented in tangible entities of the device 700 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 700 follow.

In some aspects, the device 700 may operate as a standalone device or may be connected (e.g., networked) to other devices. In a networked deployment, the communication device 700 may operate in the capacity of a server communication device, a client communication device, or both in server-client network environments. In an example, the communication device 700 may act as a peer communication device in a peer-to-peer (P2P) (or other distributed) network environment. The communication device 700 may be a UE, eNB, PC, a tablet PC, an STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term “communication device” shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term “module” is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

The communication device (e.g., UE) 700 may include a hardware processor 702 (e.g., a central processing unit (CPU), a graphics processing unit (GPU), a hardware processor core, or any combination thereof), a main memory 704, a static memory 706, and a storage device 707 (e.g., hard drive, tape drive, flash storage, or other block or storage devices), some or all of which may communicate with each other via an interlink (e.g., bus) 708.

The communication device 700 may further include a display device 710, an alphanumeric input device 712 (e.g., a keyboard), and a user interface (UI) navigation device 714 (e.g., a mouse). In an example, the display device 710, input device 712, and UI navigation device 714 may be a touchscreen display. The communication device 700 may additionally include a signal generation device 718 (e.g., a speaker), a network interface device 720, and one or more sensors 721, such as a global positioning system (GPS) sensor, compass, accelerometer, or another sensor. The communication device 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 707 may include a communication device-readable medium 722, on which is stored one or more sets of data structures or instructions 724 (e.g., software) embodying or utilized by any one or more of the techniques or functions described herein. In some aspects, registers of the processor 702, the main memory 704, the static memory 706, and/or the storage device 707 may be, or include (completely or at least partially), the device-readable medium 722, on which is stored the one or more sets of data structures or instructions 724, embodying or utilized by any one or more of the techniques or functions described herein. In an example, one or any combination of the hardware processor 702, the main memory 704, the static memory 706, or the mass storage 716 may constitute the device-readable medium 722.

As used herein, the term "device-readable medium" is interchangeable with "computer-readable medium" or "machine-readable medium". While the communication device-readable medium 722 is illustrated as a single medium, the term "communication device-readable medium" may include a single medium or multiple media (e.g., a centralized or distributed database, and/or associated caches and servers) configured to store the one or more instructions 724. The term "communication device-readable medium" is inclusive of the terms "machine-readable medium" or "computer-readable medium", and may include any medium that is capable of storing, encoding, or carrying instructions (e.g., instructions 724) for execution by the communication device 700 and that causes the communication device 700 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

Instructions 724 may further be transmitted or received over a communications network 726 using a transmission medium via the network interface device 720 utilizing any one of a number of transfer protocols. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input-multiple-output (SIMO), MIMO, or multiple-input-single-output (MISO) techniques. In some examples, the network interface device 720 may wirelessly communicate using Multiple User MIMO techniques.

The term "transmission medium" shall be taken to include any intangible medium that is capable of storing, encoding, or carrying instructions for execution by the communication device 700, and includes digital or analog communications signals or another intangible medium to facilitate communication of such software. In this regard, a transmission medium in the context of this disclosure is a device-readable medium.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

Described implementations of the subject matter can include one or more features, alone or in combination as illustrated below by way of examples.

Example 1 is an apparatus for a user equipment (UE) configured for operation in a Fifth Generation New Radio (5G NR) network, the apparatus comprising: processing circuitry, wherein to configure the UE for Reduced Capability (RedCap) operation in the 5G NR network, the processing circuitry is to: decode a master information block (MIB) to determine a control resource set (CORESET) and a common search space (CSS), the CORESET defining a downlink (DL) bandwidth part (BWP); decode a system information block (SIB) configured via downlink control information (DCI), the DCI received based on the CORESET and the CSS; determine an additional CORESET using the SIB, the additional CORESET defining an additional DL BWP; and perform paging monitoring associated with the RedCap operation using a physical downlink shared channel (PDSCH) or a physical downlink control channel (PDCCH) configured within the additional DL BWP; and a memory coupled to the processing circuitry and configured to store the MIB and the SIB.

In Example 2, the subject matter of Example 1 includes subject matter where the processing circuitry is configured to perform a random access procedure during the RedCap operation using the PDSCH or the PDCCH configured within the additional BWP.

In Example 3, the subject matter of Examples 1-2 includes subject matter where the processing circuitry is configured to determine a size of the DCI based on the CORESET.

In Example 4, the subject matter of Examples 1-3 includes subject matter where the processing circuitry is configured to perform the paging monitoring based on monitoring a PDCCH Type 2 CSS in the additional CORESET when the UE is in RRC_CONNECTED mode and physical resource blocks (PRBs) of the additional CORESET are contained within the DL BWP.

In Example 5, the subject matter of Examples 1-4 includes subject matter where the processing circuitry is configured to perform the paging monitoring based on monitoring a PDCCH Type 1 CSS in the additional CORESET when the PDCCH Type 1 CSS is indicated to map to the additional CORESET, the UE is in RRC_CONNECTED mode and physical resource blocks (PRBs) of the additional CORESET are contained within the DL BWP.

In Example 6, the subject matter of Examples 1-5 includes subject matter where a span in frequency domain of the additional CORESET is smaller than a span in frequency domain for the additional DL BWP.

In Example 7, the subject matter of Examples 1-6 includes subject matter where when the UE is in RRC_CONNECTED state, the DL BWP configures a cell defining synchronization signal block (CD-SSB) or a separate configuration for a nonCD-SSB.

In Example 8, the subject matter of Examples 1-7 includes subject matter where the processing circuitry is configured to determine a demodulation reference signal (DMRS) of the PDCCH and a DMRS of the PDSCH or a PDSCH for reception of one or more PDCCH CSS sets are Quasi-Co-Located (QCL-ed) with a cell defining synchronization signal block (CD-SSB).

In Example 9, the subject matter of Examples 1-8 includes subject matter where the processing circuitry is configured to determine an uplink (UL) BWP defined by the CORESET; and determine an additional UL BWP defined by the additional CORESET, the additional UL BWP associated with the RedCap operation.

In Example 10, the subject matter of Example 9 includes subject matter where the additional DL BWP and the additional UL BWP share a same center frequency.

In Example 11, the subject matter of Examples 1-10 includes, transceiver circuitry coupled to the processing circuitry; and one or more antennas coupled to the transceiver circuitry.

Example 12 is a computer-readable storage medium that stores instructions for execution by one or more processors of a source base station, the instructions to configure the base station for Reduced Capability (RedCap) operation in a Fifth Generation New Radio (5G NR) network, and to cause the base station to perform operations comprising: encoding a master information block (MIB) for transmission to a RedCap user equipment (UE), the MIB to configure a control resourse set (CORESET) and a common search space (CSS), the CORESET defining a downlink (DL) bandwidth part (BWP); encoding a system information block (SIB) for transmission to the RedCap UE, the SIB transmitted based on downlink control information (DCI), the DCI transmitted based on the CORESET and the CSS, the SIB to further configure an additional CORESET for the RedCap UE, and the additional CORESET defining an additional DL BWP; and encode paging information associated with the RedCap operation for transmission to the RedCap UE using a physical downlink shared channel (PDSCH) or a physical downlink control channel (PDCCH) configured within the additional DL BWP.

In Example 13, the subject matter of Example 12 includes subject matter where a span in frequency domain of the additional CORESET is smaller than a span in frequency domain for the additional DL BWP.

Example 14 is a computer-readable storage medium that stores instructions for execution by one or more processors of a user equipment (UE), the instructions to configure the UE for Reduced Capability (RedCap) operation in a Fifth Generation New Radio (5G NR) network and to cause the UE to perform operations comprising: decoding a master information block (MIB) to determine a control resource set (CORESET) and a common search space (CSS), the CORESET defining a downlink (DL) bandwidth part (BWP); decoding a system information block (SIB) configured via downlink control information (DCI), the DCI received based on the CORESET and the CSS; determining an additional CORESET using the SIB, the additional CORESET defining an additional DL BWP, and performing paging monitoring associated with the RedCap operation using a physical downlink shared channel (PDSCH) or a physical downlink control channel (PDCCH) configured within the additional DL BWP.

In Example 15, the subject matter of Example 14 includes, the operations further comprising: performing a random access procedure during the RedCap operation using the PDSCH or the PDCCH configured within the additional BWP.

In Example 16, the subject matter of Examples 14-15 includes, the operations further comprising: determining a size of the DCI based on the CORESET.

In Example 17, the subject matter of Examples 14-16 includes, the operations further comprising: performing the paging monitoring based on monitoring a PDCCH Type 2 CSS in the additional CORESET when the UE is in RRC_CONNECTED mode and physical resource blocks (PRBs) of the additional CORESET are contained within the DL BWP.

In Example 18, the subject matter of Examples 14-17 includes, the operations further comprising: performing the paging monitoring based on monitoring a PDCCH Type 1 CSS in the additional CORESET, when the PDCCH Type 1 CSS is indicated to map to the additional CORESET, the UE is in RRC_CONNECTED mode and physical resource blocks (PRBs) of the additional CORESET are contained within the DL BWP.

In Example 19, the subject matter of Examples 14-18 includes subject matter where a span in frequency domain of the additional CORESET is smaller than a span in frequency domain for the additional DL BWP.

In Example 20, the subject matter of Examples 14-19 includes subject matter where when the UE is in RRC_CONNECTED state, the DL BWP configures a cell defining synchronization signal block (CD-SSB) or a separate configuration for a nonCD-SSB.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Example 25 is an apparatus for a user equipment (UE) configured for operation in a Fifth Generation New Radio (5G NR) network, the apparatus comprising: processing circuitry, wherein to configure the UE for Reduced Capability (RedCap) operation in the 5G NR network, the processing circuitry is to: decode a master information block (MIB) to determine a control resource set (CORESET) and a common search space (CSS); decode a system information block (SIB) in a physical downlink shared channel (PDSCH) scheduled by a downlink control information (DCI) format, the DCI format received based on the CORESET and the CSS; determine an additional CORESET within a separate initial DL BWP using the SIB; and perform reception of a physical downlink control channel (PDCCH) in a PDCCH Type1 Common Search Space (CSS) set or a PDSCH associated with Random Access (RA) procedure in the separate initial DL BWP; and a memory coupled to the processing circuitry and configured to store the MIB and the SIB.

In Example 26, the subject matter of Example 25 includes subject matter where the processing circuitry is configured to: perform reception of a PDCCH in a PDCCH Type 2 CSS set or a PDSCH for paging monitoring in the separate initial DL BWP for RedCap operation.

In Example 27, the subject matter of Examples 25-26 includes subject matter where the processing circuitry is configured to: determine the initial DL BWP when the UE transitions to RRC_CONNECTED state as one of the following: separate initial DL BWP configured for RedCap UEs (separate from that indicated via initialDownlinkBWP), if provided; else, initial DL BWP configured for non-RedCap UEs (indicated via initialDownlinkBWP), if a bandwidth (BW) of the initial DL BWP for non-RedCap UEs does not exceed max RedCap UE BW.

In Example 28, the subject matter of Examples 25-27 includes subject matter where the processing circuitry is configured to: determine the initial DL BWP when the UE transitions to RRC_CONNECTED state as one of the following: separate initial DL BWP configured for RedCap UEs (separate from that indicated via initialDownlinkBWP), if provided; else, initial DL BWP configured for non-RedCap UEs (indicated via initialDownlinkBWP), if a bandwidth (BW) of the initial DL BWP for non-RedCap UEs does not exceed max RedCap UE BW; else, initial DL BWP defined by CORESET indicated by MIB.

In Example 29, the subject matter of Examples 26-28 includes subject matter where the processing circuitry is configured to: perform the paging monitoring based on monitoring a PDCCH Type 26 CSS in the additional CORESET, when the UE is in RRC_CONNECTED mode and physical resource blocks (PRBs) of the additional CORESET are contained within an active DL BWP, and the active DL BWP and the separate initial DL BWP have the same subcarrier spacing (SCS).

In Example 30, the subject matter of Examples 25-29 includes subject matter where the processing circuitry is configured to: perform random access related DL reception based on monitoring a PDCCH Type 25 CSS in the additional CORESET, when the PDCCH Type 25 CSS is indicated to map to the additional CORESET, the UE is in RRC_CONNECTED mode and physical resource blocks (PRBs) of the additional CORESET are contained within an active DL BWP, and the active DL BWP and the separate initial DL BWP have the same SCS.

In Example 31, the subject matter of Examples 25-30 includes, CSS configuration).

In Example 32, the subject matter of Examples 25-31 includes subject matter where the processing circuitry is configured to: determine a demodulation reference signal (DMRS) of the PDCCH and a DMRS of the PDSCH in the separate initial DL BWP are Quasi-Co-Located (QCL-ed) with a cell defining synchronization signal block (CD-SSB).

In Example 33, the subject matter of Examples 25-32 includes subject matter where the processing circuitry is configured to: based on reception of System Information Block Type 25 (SIB1) signalling, determine an initial uplink (UL) BWP or a separate initial UL BWP associated with the RedCap operation, for UL transmissions as part of Random Access (RA) procedure including one or more of: Message 25 (Msg1), Message 27 (Msg3), Message A (MsgA) or PUCCH in response to Message 28 (Msg4) or Message B (MsgB).

In Example 34, the subject matter of Example 33 includes, for operation in unpaired spectrum, wherein the separate initial DL BWP and the initial UL BWP or the separate initial UL BWP that is configured for UL transmissions related to RA procedure share a same center frequency.

In Example 35, the subject matter of Examples 25-34 includes, transceiver circuitry coupled to the processing circuitry; and one or more antennas coupled to the transceiver circuitry.

Example 36 is a computer-readable storage medium that stores instructions for execution by one or more processors of a source base station, the instructions to configure the base station for Reduced Capability (RedCap) operation in a Fifth Generation New Radio (5G NR) network, and to cause the base station to perform operations comprising: encoding a master information block (MIB) for transmission to a RedCap user equipment (UE), the MIB to configure a control resource set (CORESET) and a common search space (CSS); encoding a system information block (SIB) for transmission to the RedCap UE, the SIB transmitted in a physical downlink shared channel (PDSCH) scheduled by a downlink control information (DCI) format, the DCI format transmitted based on the CORESET and the CSS, the SIB to further configure an additional CORESET within a separate initial DL BWP for the RedCap UE; and encode information associated with RA procedure for transmission to the RedCap UE in the DL using a physical downlink shared channel (PDSCH) or a physical downlink control channel (PDCCH) in a PDCCH Type 25 CSS set that is configured within the separate initial DL BWP.

In Example 37, the subject matter of Example 36 includes subject matter where a span in frequency domain of the additional CORESET is smaller than or equal to a span in frequency domain for the separate initial DL BWP.

Example 38 is a computer-readable storage medium that stores instructions for execution by one or more processors of a user equipment (UE), the instructions to configure the UE for Reduced Capability (RedCap) operation in a Fifth Generation New Radio (5G NR) network, and to cause the UE to perform operations comprising: decoding a master information block (MIB) to determine a control resource set (CORESET) and a common search space (CSS); decoding a system information block (SIB) in a physical downlink shared channel (PDSCH) scheduled by a downlink control information (DCI) format, the DCI format received based on the CORESET and the CSS; determining an additional CORESET within a separate initial DL BWP using the SIB; and performing reception of a physical downlink control channel (PDCCH) in a PDCCH Type1 Common Search Space (CSS) set or a PDSCH associated with Random Access (RA) procedure in the separate initial DL BWP.

In Example 39, the subject matter of Example 38 includes, the operations further comprising: perform reception of a PDCCH in a PDCCH Type 26 CSS set or a PDSCH for paging monitoring in the separate initial DL BWP for RedCap operation.

In Example 40, the subject matter of Examples 38-39 includes, the operations further comprising: determining the initial DL BWP when the UE transitions to RRC_CONNECTED state as one of the following: separate initial DL BWP configured for RedCap UEs (separate from that indicated via initialDownlinkBWP), if provided; else, initial DL BWP configured for non-RedCap UEs (indicated via initialDownlinkBWP), if a bandwidth (BW) of the initial DL BWP for non-RedCap UEs does not exceed max RedCap UE BW.

In Example 41, the subject matter of Examples 38-40 includes, the operations further comprising: determining the initial DL BWP when the UE transitions to RRC_CONNECTED state as one of the following: separate initial DL BWP configured for RedCap UEs (separate from that indicated via initialDownlinkBWP), if provided; else, initial DL BWP configured for non-RedCap UEs (indicated via initialDownlinkBWP), if a bandwidth (BW) of the initial DL BWP for non-RedCap UEs does not exceed max RedCap UE BW; else, initial DL BWP defined by CORESET indicated by MIB.

In Example 42, the subject matter of Examples 39-41 includes, the operations further comprising: performing the paging monitoring based on monitoring a PDCCH Type 26 CSS in the additional CORESET, when the UE is in RRC_CONNECTED mode and physical resource blocks (PRBs) of the additional CORESET are contained within an active DL BWP, and the active DL BWP and the separate initial DL BWP have the same subcarrier spacing (SCS).

In Example 43, the subject matter of Examples 38-42 includes, the operations further comprising: performing random access related DL reception based on monitoring a PDCCH Type 25 CSS in the additional CORESET, when the PDCCH Type 25 CSS is indicated to map to the additional CORESET, the UE is in RRC_CONNECTED mode and physical resource blocks (PRBs) of the additional CORESET are contained within an active DL BWP, and the active DL BWP and the separate initial DL BWP have the same SCS.

In Example 44, the subject matter of Examples 38-43 includes, CSS configuration).

Example 45 is at least one machine-readable medium including instructions that, when executed by processing circuitry, cause the processing circuitry to perform operations to implement of any of Examples 25-44.

Example 46 is an apparatus comprising means to implement of any of Examples 25-44.

Example 47 is a system to implement of any of Examples 25-44.

Example 48 is a method to implement of any of Examples 25-44.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus for user equipment with reduced capabilities (RedCap UE) configured for operation in a Fifth Generation New Radio (5G NR) network, the apparatus comprising:

processing circuitry, wherein to configure the RedCap UE for a random access procedure in the 5G NR network, the processing circuitry is to:

decode first system information block (SIB) configuration signaling to obtain an initial downlink bandwidth part (DL BWP), the initial DL BWP including downlink resources of a common search space (CSS), wherein for the RedCap UE, the first SIB configuration signaling indicates the initial DL BWP for use by the RedCap UE that is different than an initial DL BWP signaled in the first SIB configuration signaling for use by non-RedCap UEs;

decode second SIB configuration signaling to obtain an initial uplink bandwidth part (UL BWP) of the RedCap UE, the initial UL BWP of the RedCap UE including uplink resources, and wherein the second SIB configuration signaling indicates the initial UL BWP for use by the RedCap UE that is different than an initial UL BWP signaled in the second SIB configuration signaling for use by the non-RedCap UEs; and perform the random access procedure on the initial DL BWP and the initial UL BWP obtained from the first SIB configuration signaling and the second SIB configuration signaling respectively, the random access procedure based on decoding a first random access communication received using the downlink resources of the CSS of the initial DL BWP and encoding a second random access communication for transmission using the uplink resources of the initial UL BWP; and a memory coupled to the processing circuitry and configured to store the first SIB configuration signaling and the second SIB configuration signaling.

2. The apparatus of claim 1, wherein a center frequency of the initial DL BWP of the RedCap UE is same as a center frequency of the initial UL BWP of the RedCap UE.

3. The apparatus of claim 1, wherein the processing circuitry is to;

decode while in RRC_CONNECTED state, third configuration signaling, wherein the third configuration signaling configures an active DL BWP for the RedCap UE, and wherein the active DL BWP includes a synchronization signal block (SSB).

4. The apparatus of claim 3, wherein the SSB is a non-cell defining SSB.

5. The apparatus of claim 1, wherein the processing circuitry is to:

decode a system information block (SIB) in a physical downlink shared channel (PDSCH) scheduled by a downlink control information (DCI) format, the DCI format received based on the CSS;

determine an additional control resource set (CORESET) within a separate initial DL BWP using the SIB; and perform reception of a physical downlink control channel (PDCCH) in a PDCCH Type1 CSS set or a PDSCH associated with a second random access procedure in the separate initial DL BWP.

6. The apparatus of claim 5, wherein the processing circuitry is configured to:

perform reception of a PDCCH in a PDCCH Type 2 CSS set or a PDSCH for paging monitoring in the separate initial DL BWP for RedCap operation.

7. The apparatus of claim 6, wherein the processing circuitry is configured to:

perform the paging monitoring based on monitoring a PDCCH Type 2 CSS in the additional CORESET, when the UE is in RRC_CONNECTED mode and physical resource blocks (PRBs) of the additional CORESET are contained within an active DL BWP, and the active DL BWP and the separate initial DL BWP have a same subcarrier spacing (SCS).

8. The apparatus of claim 5, wherein the processing circuitry is configured to:

perform random access-related DL reception based on monitoring a PDCCH Type 1 CSS in the additional CORESET, when the PDCCH Type 1 CSS is indicated to map to the additional CORESET, the UE is in RRC_CONNECTED mode and physical resource blocks (PRBs) of the additional CORESET are contained within an active DL BWP, and the active DL BWP and the separate initial DL BWP have a same SCS.

9. The apparatus of claim 5, wherein when the UE is in RRC_CONNECTED state and if the UE does not indicate capability of operating in a DL BWP without synchronization signal block (SSB), the UE expects that either an active RRC-configured DL BWP, includes a cell-defining synchronization signal block (CD-SSB) or a separate configuration for a non-CD-SSB within the active DL BWP is provided, wherein the non-CD-SSB is an SSB that is not used to determine a Primary Cell IDentity (PCID) or obtain SIB1 scheduling information (PDCCH Type 0 CSS configuration) .

10. The apparatus of claim 1, further comprising:

transceiver circuitry coupled to the processing circuitry; and one or more antennas coupled to the transceiver circuitry.

11. A non-transitory computer-readable storage medium that stores instructions for execution by one or more processors of a source base station, the instructions to configure the base station for Reduced Capability (RedCap) operation in a Fifth Generation New Radio (5G NR) network, and to cause the base station to perform operations comprising:

encoding first system information block (SIB) configuration signaling for transmission to a RedCap user equipment (UE), the first SIB configuration signaling associated with an initial downlink bandwidth part (DL BWP), the initial DL BWP including downlink resources of a common search space (CSS), wherein for the RedCap UE, the first SIB configuration signaling indicates the initial DL BWP for use by the RedCap UE that is different than an initial DL BWP signaled in the first SIB configuration signaling for use by non-RedCap UEs;

encoding second SIB configuration signaling for transmission to the RedCap UE, the second SIB configuration signaling associated with an initial uplink bandwidth part (UL BWP) of the RedCap UE, the initial UL BWP of the RedCap UE including uplink resources, and wherein for the RedCap UE, the second SIB configuration signaling indicates the initial UL BWP for use by the RedCap UE that is different than an initial UL BWP signaled in the second SIB configuration signaling for use by the non-RedCap UEs; and encoding a random access communication for transmission to the RedCap UE using the downlink resources of the CSS of the initial DL BWP, the random access communication associated with a random access procedure performed on the initial DL BWP and the initial UL BWP that are based on the first SIB configuration signaling and the second SIB configuration signaling respectively.

12. The computer-readable storage medium of claim 11, wherein a center frequency of the initial DL BWP of the RedCap UE is same as a center frequency of the initial UL BWP of the RedCap UE.

13. The computer-readable storage medium of claim 11, the operations further comprising:

encoding third configuration signaling for transmission to the RedCap UE, wherein the RedCap UE is in RRC_CONNECTED state, and wherein the third configuration signaling configures an active DL BWP for the RedCap UE, and wherein the active DL BWP includes a synchronization signal block (SSB).

14. A non-transitory computer-readable storage medium that stores instructions for execution by one or more processors of a Reduced Capability user equipment (RedCap UE), the instructions to configure the RedCap UE for RedCap operation in a Fifth Generation New Radio (5G NR) network, and to cause the RedCap UE to perform operations comprising:

decoding first system information block (SIB) configuration signaling to obtain an initial downlink bandwidth part (DL BWP), the initial DL BWP including downlink resources of a common search space (CSS), wherein for the RedCap UE, the first SIB configuration signaling indicates the initial DL BWP for use by the RedCap UE that is different than an initial DL BWP signaled in the first SIB configuration signaling for use by non-RedCap UEs;

decoding second SIB configuration signaling to obtain an initial uplink bandwidth part (UL BWP) of the RedCap UE, the initial UL BWP of the RedCap UE including uplink resources, and wherein for a RedCap UE, the second SIB configuration signaling indicates the initial UL BWP for use by the RedCap UE that is different than an initial UL BWP signaled in the second SIB configuration signaling for use by the non-RedCap UEs; and performing a random access procedure on the initial DL BWP and the initial UL BWP obtained from the first SIB configuration signaling and the second SIB configuration signaling, respectively, the random access procedure based on decoding a first random access communication received using the downlink resources of the CSS of the initial DL BWP and encoding a second random access communication for transmission using the uplink resources of the initial UL BWP.

15. The computer-readable storage medium of claim 14, wherein a center frequency of the initial DL BWP of the RedCap UE is same as a center frequency of the initial UL BWP of the RedCap UE.

16. The computer-readable storage medium of claim 14, the operations further comprising:

decoding while in RRC_CONNECTED state, third configuration signaling, wherein the third configuration signaling configures an active DL BWP for the RedCap UE, and wherein the active DL BWP includes a synchronization signal block (SSB).

17. The computer-readable storage medium of claim 16, wherein the SSB is a non-cell defining SSB.

18. The computer-readable storage medium of claim 14, the operations further comprising:

decoding a system information block (SIB) in a physical downlink shared channel (PDSCH) scheduled by a downlink control information (DCI) format, the DCI format received based on the CSS;

determining an additional control resource set (CORESET) within a separate initial DL BWP using the SIB; and performing reception of a physical downlink control channel (PDCCH) in a PDCCH Type1 CSS set or a PDSCH associated with a second random access procedure in the separate initial DL BWP.

19. The computer-readable storage medium of claim 18, the operations further comprising:

performing reception of a PDCCH in a PDCCH Type 2 CSS set or a PDSCH for paging monitoring in the separate initial DL BWP for RedCap operation.

20. The computer-readable storage medium of claim 19, the operations further comprising:

performing the paging monitoring based on monitoring a PDCCH Type 2 CSS in the additional CORESET, when the UE is in RRC_CONNECTED mode and physical resource blocks (PRBs) of the additional CORESET are contained within an active DL BWP, and the active DL BWP and the separate initial DL BWP have a same subcarrier spacing (SCS).

* * * * *